(12) United States Patent  
Liu et al.

(10) Patent No.: US 7,508,455 B2
(45) Date of Patent: Mar. 24, 2009

(54) METHOD, SYSTEM, AND DEVICE FOR AUTOMATIC DETERMINATION OF NOMINAL BACKING COLOR AND A RANGE THEREOF

(75) Inventors: Yu Liu, Ottawa (CA); David Allan Ross, Nepean (CA); Alun John Fryer, Ontario (CA)

(73) Assignee: Ross Video/Live Production Technology, Nepean, Ontario (CA)

( * ) Notice: Subject to any disclaimer, the term of this patent is extended or adjusted under 35 U.S.C. 154(b) by 685 days.

(21) Appl. No.: 11/072,502

(22) Filed: Mar. 7, 2005

(65) Prior Publication Data

US 2005/0212820 A1 Sep. 29, 2005

Related U.S. Application Data

(60) Provisional application No. 60/556,504, filed on Mar. 26, 2004.

(51) Int. Cl.
*H04N 9/74* (2006.01)
*H04N 9/75* (2006.01)

(52) U.S. Cl. ........................ 348/587; 348/592

(58) Field of Classification Search .......... 348/587, 348/592, 722, 586; 345/473, 581, 620; 352/352; 382/195, 203, 204
See application file for complete search history.

(56) References Cited

U.S. PATENT DOCUMENTS

| 4,344,085 | A | 8/1982 | Vlahos |
| 4,533,937 | A | 8/1985 | Yamamoto et al. |
| 4,630,101 | A | 12/1986 | Inaba et al. |
| 5,032,901 | A | 7/1991 | Vlahos |
| 5,202,762 | A | 4/1993 | Fellinger |
| 5,249,039 | A | 9/1993 | Chaplin |
| 5,355,174 | A | 10/1994 | Mishima |
| 5,400,081 | A | 3/1995 | Chaplin |
| 5,424,781 | A | 6/1995 | Vlahos |
| 5,500,684 | A | 3/1996 | Uya |
| 5,515,109 | A | 5/1996 | Vlahos et al. |
| 5,539,475 | A | 7/1996 | Sadjadian et al. |
| 5,696,892 | A * | 12/1997 | Redmann et al. ............ 345/582 |
| 5,708,479 | A | 1/1998 | Gehrmann |
| 5,719,640 | A | 2/1998 | Gehrmann |
| 5,774,191 | A | 6/1998 | Iverson |
| 5,812,214 | A | 9/1998 | Miller |
| 5,838,310 | A | 11/1998 | Uya |
| 5,903,318 | A | 5/1999 | Demay et al. |
| 5,923,381 | A | 7/1999 | Demay et al. |
| 6,011,595 | A | 1/2000 | Henderson et al. |

(Continued)

*Primary Examiner*—Victor R Kostak
(74) *Attorney, Agent, or Firm*—Nixon Peabody LLP; Jeffrey L. Costellia

(57) ABSTRACT

A method, system, and device for generating a clean clipping signal $\alpha$ for a chromakey function or a video composition, including identifying background colors formed by a solid color background, shadows cast by still and moving subjects, a non-uniform reflection caused by spot lighting and non-flat backdrop or flaw wall, and translucent foreground objects, with a 3D volume in a 3D color space; determining parameters defining same by using a dirty alpha $\alpha$; generating a clean clipping signal $\alpha_{shd}$ background colors, and a clean clipping signal $\alpha_{tsl}$ for translucency colors; identifying foreground colors formed by the still and moving subjects with a 3D volume in a 3D color space; classifying colors into transition colors; and generating an area map for mapping each pixel into background, shadow, translucent, foreground, and transition areas.

63 Claims, 26 Drawing Sheets

U.S. PATENT DOCUMENTS

| | | | |
|---|---|---|---|
| 6,072,537 A * | 6/2000 | Gurner et al. | 348/586 |
| 6,134,345 A | 10/2000 | Berman et al. | |
| 6,134,346 A | 10/2000 | Berman et al. | |
| 6,141,063 A | 10/2000 | Gehrmann | |
| 6,348,953 B1 * | 2/2002 | Rybczynski | 348/584 |
| 6,445,816 B1 | 9/2002 | Pettigrew | |
| 6,668,078 B1 * | 12/2003 | Bolle et al. | 382/164 |
| 6,731,799 B1 * | 5/2004 | Sun et al. | 382/173 |
| 7,184,047 B1 * | 2/2007 | Crampton | 345/473 |
| 2002/0145103 A1 * | 10/2002 | Bernardini et al. | 250/208.1 |
| 2003/0201994 A1 * | 10/2003 | Taylor et al. | 345/581 |
| 2005/0099603 A1 * | 5/2005 | Thomas et al. | 352/85 |

* cited by examiner

METHOD, SYSTEM, AND DEVICE FOR AUTOMATIC DETERMINATION OF NOMINAL BACKING COLOR AND A RANGE THEREOF

CROSS REFERENCE TO RELATED DOCUMENTS

The present invention claims benefit of priority to U.S. Provisional Patent Application Ser. No. 60/556,504 of LIU et al., entitled "Method, System, and Device for Automatic Determination of Nominal Backing Color and A Range Thereof," filed Mar. 26, 2004, the entire disclosure of which is hereby incorporated by reference herein.

BACKGROUND

1. Field of the Invention

This invention relates generally to a method, system, and device for a chromakey function used in motion picture processing or composition. Such a chromakey function can provide a clean key signal and clean clipped-out foreground pictures without background colors. More specifically, the present invention pertains to a method, system and device for automatic determination of parameters which are used in a chromakey function as well as implementation of such method based on hardware means and software means. The present invention is related to technologies referenced in the List of References section of the present specification, and in brackets throughout the present specification, the entire disclosures of all of which are hereby incorporated by reference herein.

2. Discussion of the Background

Chromakey is a process used for special effects in motion picture and video industries where objects of interest against a backing color are shot into an electronic image, then this shot or image is used to generate a clipping signal called "Alpha", "Key" or "Matte" in different application fields. It ranges from zero to unit and shows regions of the foreground objects, the background colors, and the transition boundaries between the objects and the background color. With such a clipping signal, a new picture can replace the backing color as a new background. The entire replacement process is technically called composition. The history and applications about chromakey and composition are well known and described in the prior art referenced to [1], [2], [3], [4], [5], [6] and [7], and in the List of References.

Solutions for a chromakey function in the prior art focuses on two issues:

Issue 1: pre-defines two-dimensional (2D) areas or three-dimensional (3D) volumes in a color space for background colors and foreground objects. Between foreground and background areas in the color space are transition color areas contributed by foreground objects' boundaries, semi-transparent objects, and shadows. Usually, the two geometrical shapes are not overlapped.

Issue 2: determines the parameters for the two geometrical shapes, such as the centroid of convex closed curves or volumes, sizes of shapes, alpha values between surfaces of two volumes, and so on. In this invention, the terms nominal backing color or reference background color refer to the centroid of a geometrical shape for the background colors.

Many patents and the literature can be found for Issue 1 on how to make better geometric shapes to classify and identify the color space, referenced to Appendix. A recent trend shows that instead of using geometrical shapes, people started to use more complex mathematical models in statistics to classify and identify color clusters. These mathematical models include Bayesian inference or MAP (maximum a posteriori) and PCA (principal component analysis), referenced to [8], [9], [10], [11], [12]. Although we see these methods published in the academic field and applied for still pictures or non-linear edition, we believe that these complex models will be applied to the motion picture industry with progress of semiconductor technology and computing devices in the future.

On the other hand, we barely find out the literature and patents on how to determine parameters for those geometric shapes, such as the nominal backing color and its range. Most of commercial products rely on user interface (UI) devices to implement Issue 2 as shown in FIG. 1. Through the UI devices, a single or multiple samples on the background is picked to determine the nominal backing color, which determines the centroid and range of the background area. And then multiple samples from foreground objects, and even the transition area are picked and used to tune the geometrical shapes in the color space until a satisfactory result is achieved. Usually, picking samples from a reference picture occurs in the first several frames of moving pictures. Such a manual determination process for chromakey parameters through UI devices has following disadvantages.

1) Sampling at different areas for the nominal backing color causes different results if background colors are not uniform. This is because the alpha value for each pixel is calculated in terms of this nominal backing color. If the nominal backing color changes, alpha values of pixels also changes. Usually, samples on the bright areas with high saturation give better results.

2) Once the nominal backing color is determined, it is hardly modified on the fly, because moving foreground objects on the fly could occupy any spot on background and do not give users enough time to pick proper background samples. When background colors change due to lighting, the predetermined nominal backing color certainly causes changes of alpha in the background area. For example, if a camera aims at a bright part of a large-area backdrop and takes samples for the nominal backing color but later it moves to a dark part of the backdrop, the entire background would become dark. This is because the dark background area appears like shadows in terms of bright reference color.

U.S. Pat. No. 5,774,191 discloses a method for determination of chromakey range based on histogram of one or more color component. It has following disadvantages.

1) Only one-dimensional histograms are used. Theoretically, a chromakey function is based on the 2D chroma vector or 3D color space, and hence color ranges must be determined by 2D or 3D histograms. However, 2D or 3D histograms require large memory devices to collect statistical data, which dramatically increases the cost of a chromakey function.

2) Due to one-dimensional histogram used, only rectangle shape or cubical shape is used to define the backing color region, which does not correctly separate foreground colors and background colors in many real cases.

U.S. Pat. No. 5,838,310 also discloses a method for determination of a key color range based on three histograms from color components R, G, and B respectively. Since this patent uses one-dimensional histogram, as U.S. Pat. No. 5,774,191 does, it has the same disadvantage as the above. Different from the prior art, U.S. Pat. No. 5,838,310 calculates histograms only on those pixels which are identified as the background colors. However, this method requires users to define background regions on a picture during initialization stage, and the optimum range for the key color depends on how to choose the background regions. Moreover, it requires an extra storage called plane memory to identify background pixels.

SUMMARY OF THE INVENTION

Therefore, there is a need for a method, system, and device that addresses the above and other problems with conventional systems and methods. Accordingly, in exemplary aspects of the present invention, a method, system, and device are provided for generating a clean clipping signal a for a chromakey function or a video composition, including identifying background colors formed by a solid color background, shadows cast by still and moving subjects, a non-uniform reflection caused by spot lighting and non-flat backdrop or flaw wall, and translucent foreground objects, with a 3D volume in a 3D color space; determining parameters defining same by using a dirty alpha α; generating a clean clipping signal $\alpha_{shd}$ for background colors, and a clean clipping signal $\alpha_{tsl}$ for translucency colors; identifying foreground colors formed by the still and moving subjects with a 3D volume in a 3D color space; classifying colors into transition colors; and generating an area map for mapping each pixel into background, shadow, translucent, foreground, and transition areas. Advantageously, the exemplary process for identification and classification produces a side effect called an area map, which labels each pixel with one of the preceding areas and becomes useful for a user interface.

Still other aspects, features, and advantages of the present invention are readily apparent from the following detailed description, simply by illustrating a number of exemplary embodiments and implementations, including the best mode contemplated for carrying out the present invention. The present invention also is capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

A method, system, and device for automatically determining a nominal backing color and a range thereof are described. In the following description, for purposes of explanation, numerous specific details are set forth in order to provide a thorough understanding of the present invention. It is apparent to one skilled in the art, however, that the present invention can be practiced without these specific details or with equivalent arrangements. In some instances, well-known structures and devices are shown in block diagram form in order to avoid unnecessarily obscuring the present invention.

The present invention describes a novel method, system and device to solve the problems posed in the prior art. The exemplary method automatically determines the nominal backing color and its range. It need not employ collecting samples through user interface devices from time to time; instead, it can employ users giving a rough range of background colors by choosing one color from 3 principal colors (red, green, blue) and 3 complementary colors (yellow, cyan, magenta) as the initial color one time. Since these six colors are very distinctive in common sense, users can easily decide which color is a good match to the real background. Once a rough range of background color is determined, the exemplary method can automatically find out the optimal nominal backing color and its range; and also it can monitor the changes of background colors and recalculate these parameters. In other words, the exemplary method is capable of recalculating parameters on the fly because the method collects image data from an entire picture or a large area of picture instead of fixed spots on a picture in the prior art. From the collected data, parameters are derived and used to determine the nominal backing color and its range on the fly. The exemplary data collection is implemented by accumulations of various weighed color components and averages of accumulated data. This invention also describes means of how to implement the exemplary method.

Figure 1:
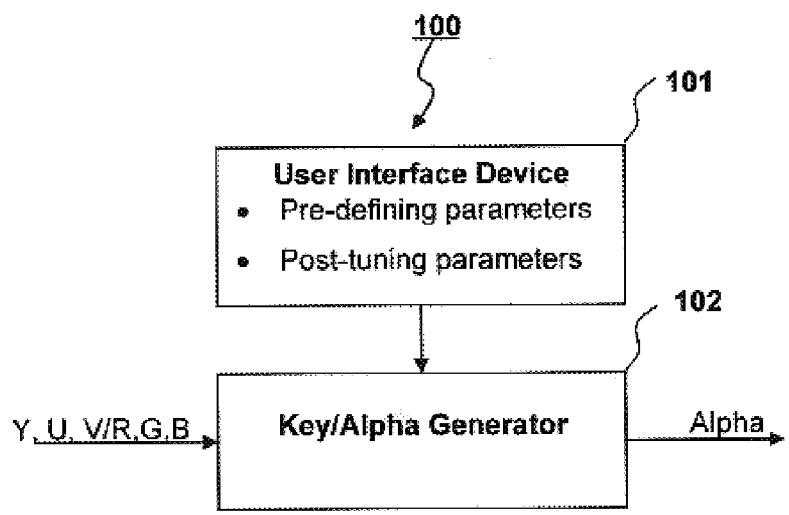
FIG. 1 is a block diagram that shows a common commercial chromakey device that relies on good user interface devices.
Figure 2:
FIG. 2 is a typical chromakey picture shot in a video-like studio.
Figure 3:
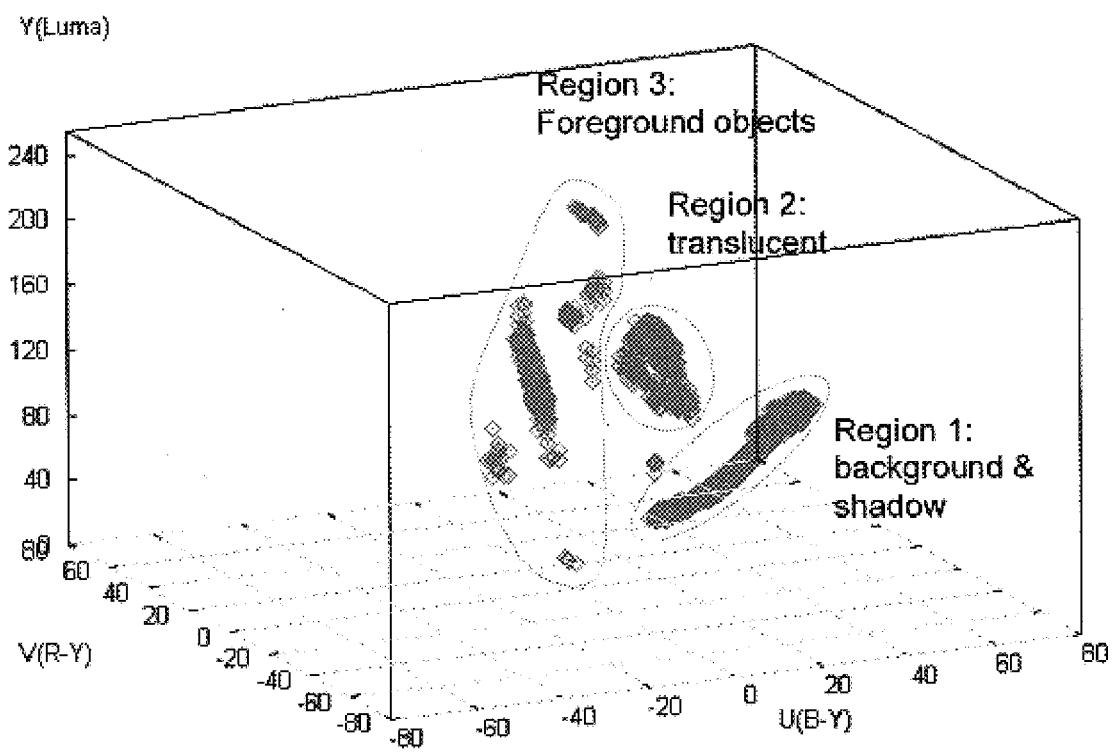
FIG. 3 is a graph that shows 3D color distributions collected from the picture in FIG. 2.
Figure 4:
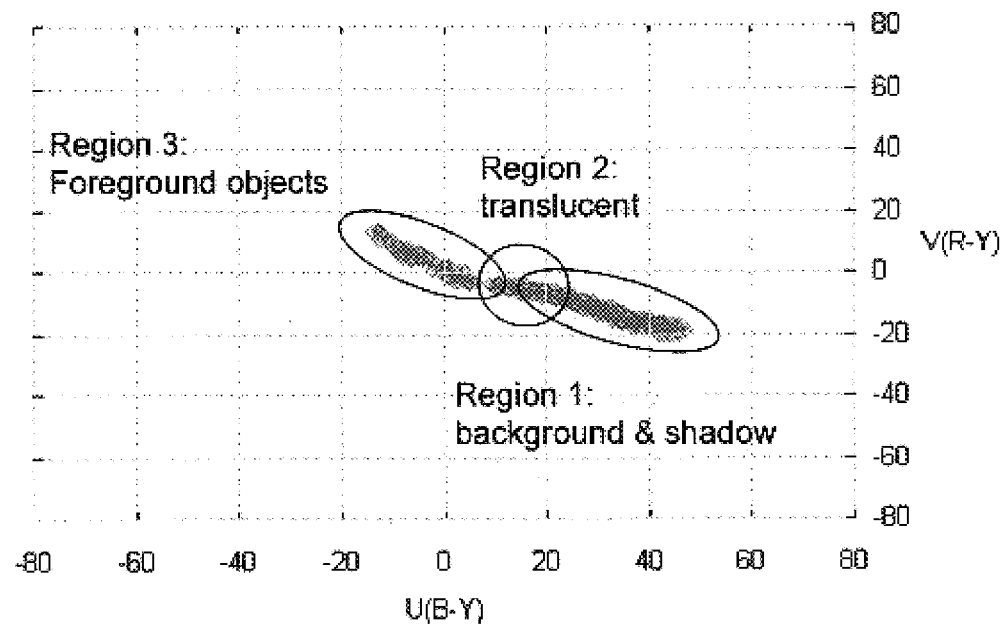
FIG. 4 is a graph that shows a projection of 3D color distributions in FIG. 3 onto a 2D chromatic plane.

The basic idea behind this invention is motivated by the observation of color distribution in 2D and 3D color space from many chromakey pictures. FIG. 2 shows a typical chromakey picture shot in a studio-like setting. FIG. 3 is the color distributions or color clusters in YUV space for the picture in FIG. 2. There are three regions: region 1 is the background including shadows; region 2 is the transition area from translucent foreground objects between background region 1 and foreground region 3. The three regions are distinctly separated in 3D color space. FIG. 4 is the projection of 3D color distribution into 2D chromatic UV plane. Apparently in 2D chromatic plane, parts of foreground colors are mapped into the area occupied by the background region. Therefore, it is difficult and impossible for a chromakey device working only on 2D chromatic plane to properly separate background and foreground. On the other hand, regular 3D shapes, such as cone, cylinder, oval and sphere shown in Appendix A, hardly depict the boundary surfaces for color clusters in FIG. 3. Polyhedron easily constructs flexible shapes but implementation, especially for the motion pictures, causes high cost.

Figure 5:
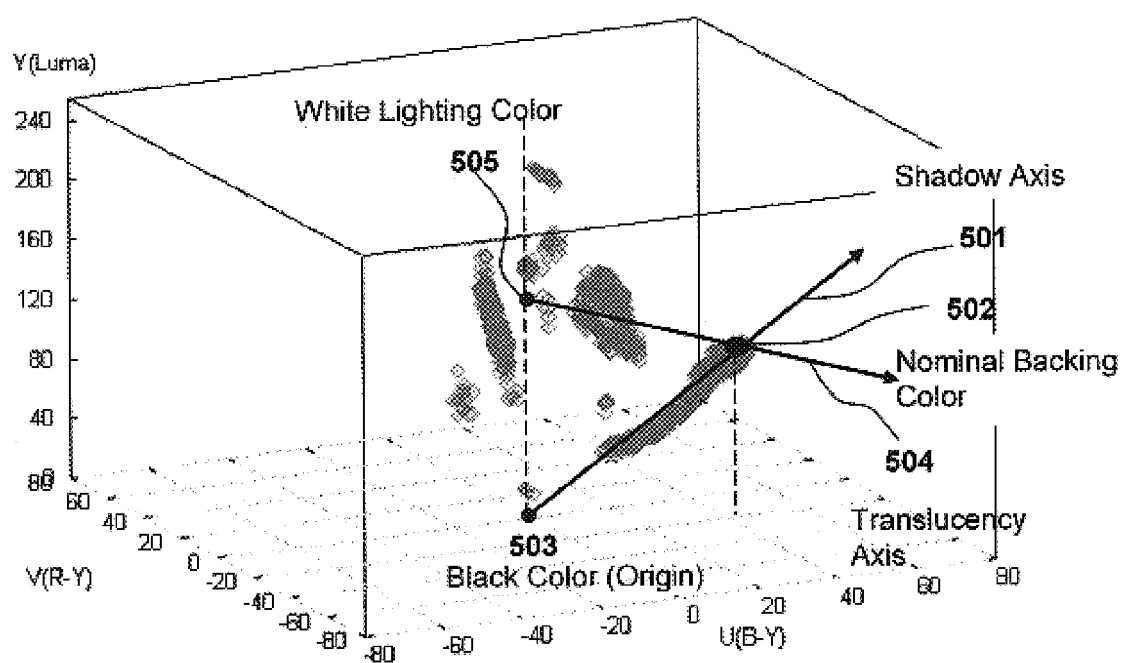
FIG. 5 is a 3D graph that shows concepts of a shadow axis, a nominal backing color, and a translucency axis.
Figure 6:
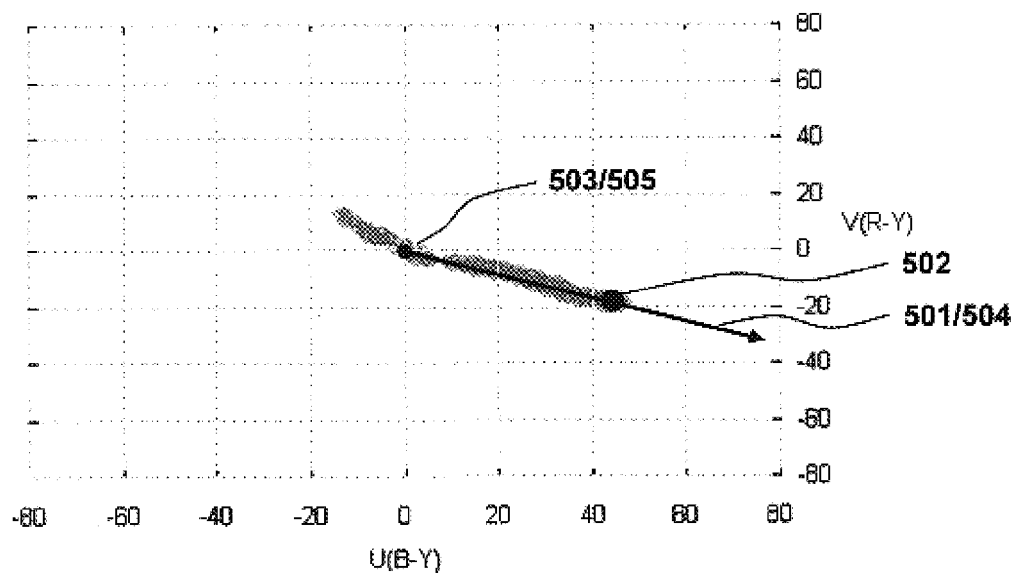
FIG. 6 is a graph that shows a shadow axis, a nominal backing color, and a translucency axis in a 2D chromatic plane.

The present invention introduces a term shadow axis which is a semi line starting from the origin—black color 503 and pointing to the nominal backing color in the 3D color space such as YUV domain as shown in FIG. 5. In FIG. 5, 501 is the shadow axis which passes through the nominal backing color 502. The shadow axis projected into 2D chromatic plane is shown in FIG. 6. Physically, the nominal backing color 502 is contributed by the average brightness of the background when a light casts on the background without any foreground blocking. Any shadow caused by the foreground blocking is considered as the result of linearly decreased illumination of the light, and hence the shadow colors must spread along the shadow axis. Notice that many real pictures may show a little departure from shadow colors to the shadow axis.

Similar to the shadow axis, another term translucency axis is introduced to represent translucent areas' colors. The translucency axis 504 shown in FIG. 5 is an axis starting from a color 505 on the Y (luma) axis, pointing outward and passing through the nominal backing color 502. In the real world, the color 505 is a white light reflection from transparent/semi-transparent non-color objects such as glass, smoke, water, and so on. Generally, the white light color 505 shifts up or down around a value equivalent to the luminance of the backing color, depending on how shiny the surfaces of transparent/semi-transparent objects are. Any translucency color caused by non-color foreground objects is considered as the blending of a white color and the backing color. Physically, colors from translucent areas spread along the translucency axis due to light diffusion. FIG. 6 shows the translucency axis projected into a 2D chromatic plane and overlaid on the shadow axis.

In the real world, a single translucency axis may not be enough to represent entire transparent/semi-transparent objects in a foreground. Each transparent/semi-transparent object may have different colors rather than non-color material. Therefore, the white light color 505 in FIG. 5 could be off the luma axis. One embodiment of this invention implements a single translucency axis under the assumption that most of translucent objects are non-color. However, the present invention does not limit the concept of translucency axis to a single one, and covers any extension to multiple translucency axes for multiple transparent/semi-transparent objects of different colors.

Different from the prior art where background colors only include the solid background color, the present invention considers background colors contributed by shadows, non-uniform light reflection, and transparent/semi-transparent objects. This is because 1) the background color cluster shown in region 1 of FIG. 3 does not show a distinct border between the shadows and the solid background color; 2) the translucency color cluster overlaps the shadow color cluster in 2D chromatic plane, as shown in FIG. 4; and 3) although translucent area cluster such as region 2 of FIG. 3 is distinctively separated from the solid background color, many real cases show no distinct borders between translucency color and the solid background color either. By these considerations, it is reasonable to group shadow, translucency and solid background color together as parts of background. By the grouping, on the other hand, we easily achieve some unique special effects for composition in this present invention, which are a controllable shadow effect and a controllable translucency effect. As presented later in Equations 1a-1d, a clean alpha generated for shadow area or translucent area can be controlled by a factor to emphasize or de-emphasize, even remove shadows or translucency.

Based on the facts described above, the present invention implements a simple and effective method to classify background and foreground as following steps.

Figure 7A:
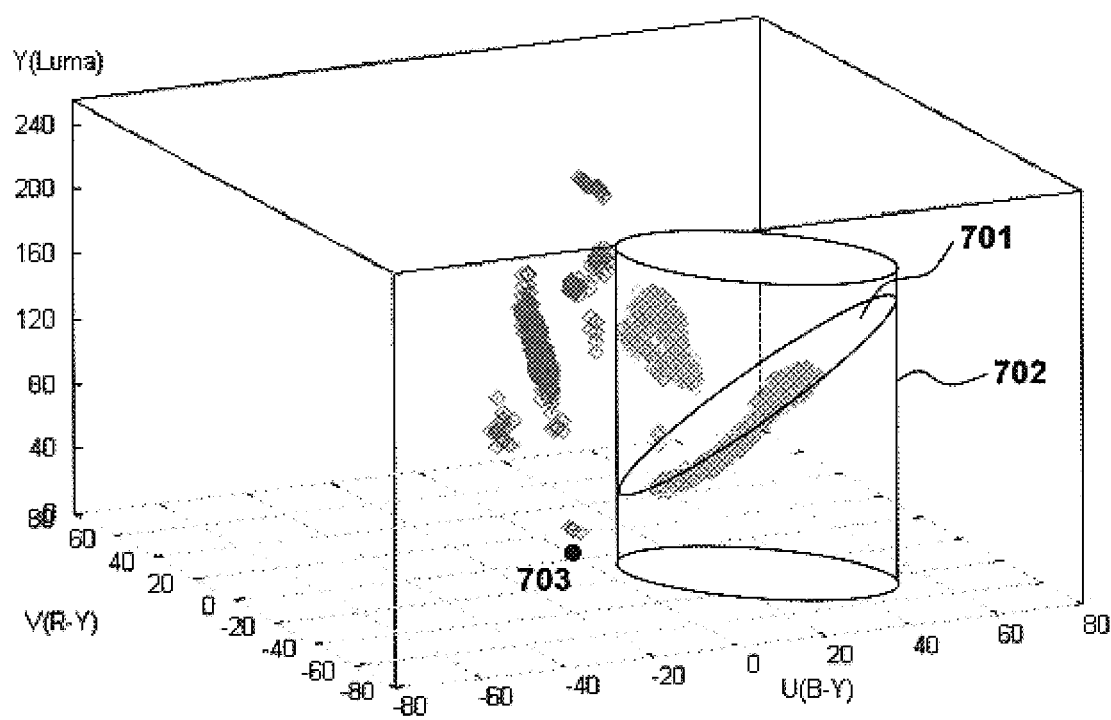
FIG. 7a is a 3D graph that shows a 3D shape defined by the present invention.
Figure 7B:
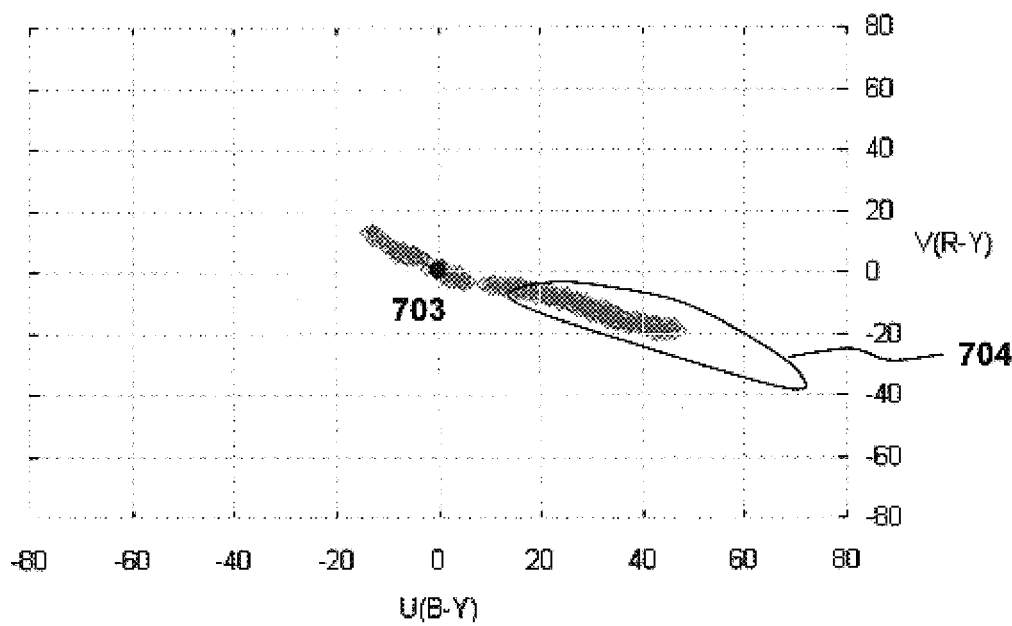
FIG. 7b is a 2D graph that shows a projection of the 3D shape in FIG. 7a onto a 2D plane.

1) A two-semi-ellipse cylindrical segment is constructed to define the background region, as shown in FIG. 7a where a tilted plane 701 slices a two-semi-ellipse cylinder 702 and separates the background region into two parts. The upper part contains translucency colors and the lower part contains shadow colors. The tilted plane is constructed by rotating UV plane around the origin 703 to align with the shadow axis and then shifting along the Y axis. The shift distance is determined by the maximum departure of the luma component from the shadow axis. The two semi-ellipses share the same long axis and the same center. The center is the nominal backing color as shown in FIG. 7b.

Figure 8A:
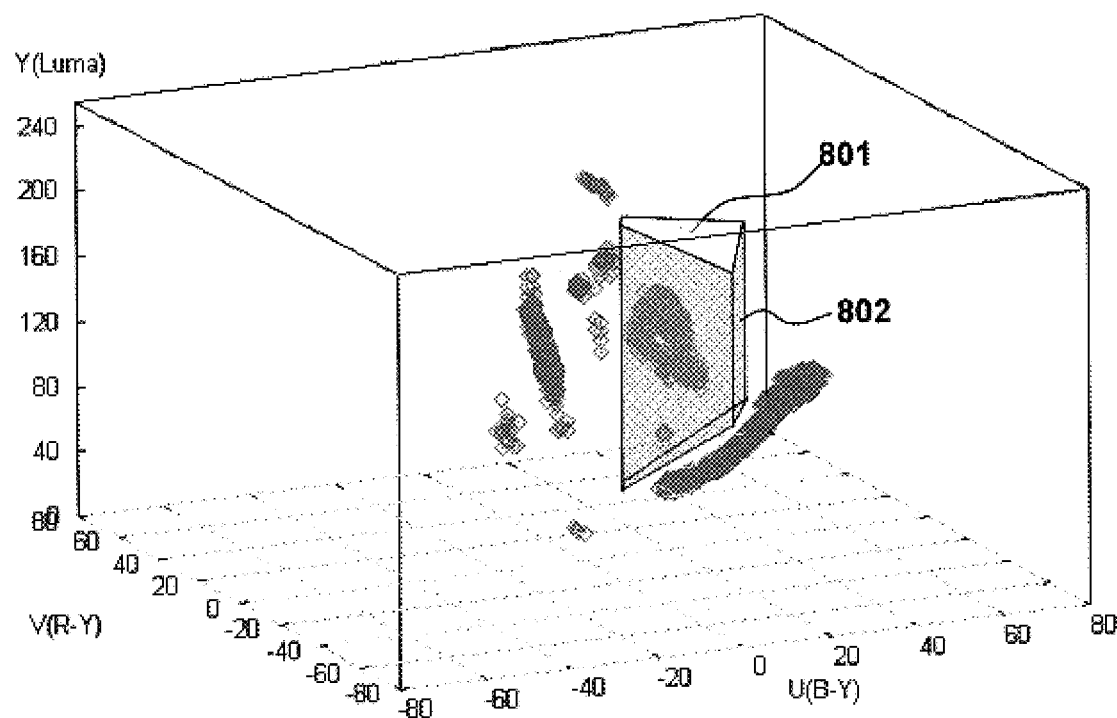
FIG. 8a is a 3D graph that shows an alternative 3D volume to confine translucency colors.
Figure 8B:
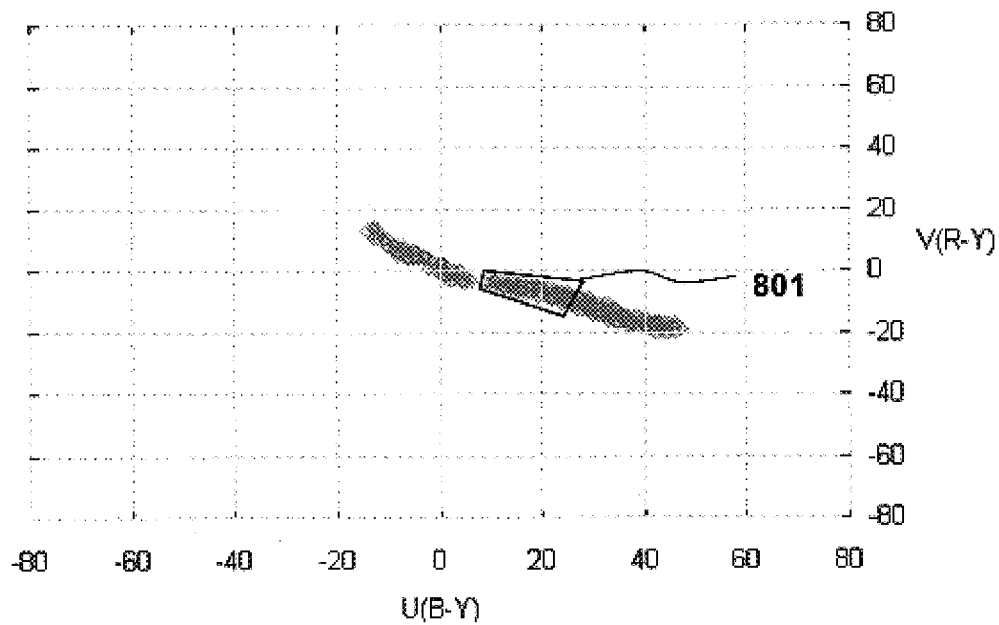
FIG. 8b is a 2D graph that shows a projection of the 3D shape in FIG. 8a onto a 2D plane.

In an exemplary implementation, the translucent area can be further confined. Moreover, an alternative way to identify translucency colors is to confine the translucent area to other shapes, such as a wedged cylinder instead of the cylinder 702. An example of such alternative is shown in FIG. 8a-b.

Figure 9:
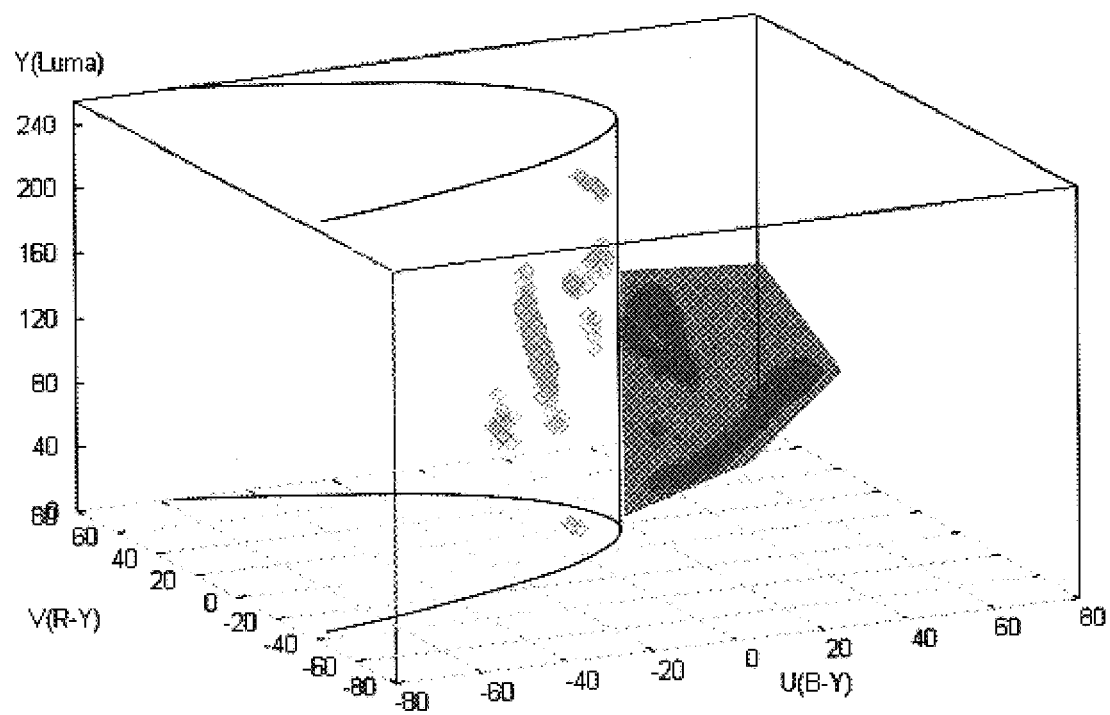
FIG. 9 is a 3D graph that contains a curved surface to separate foreground colors area and a transition area.
Figure 10:
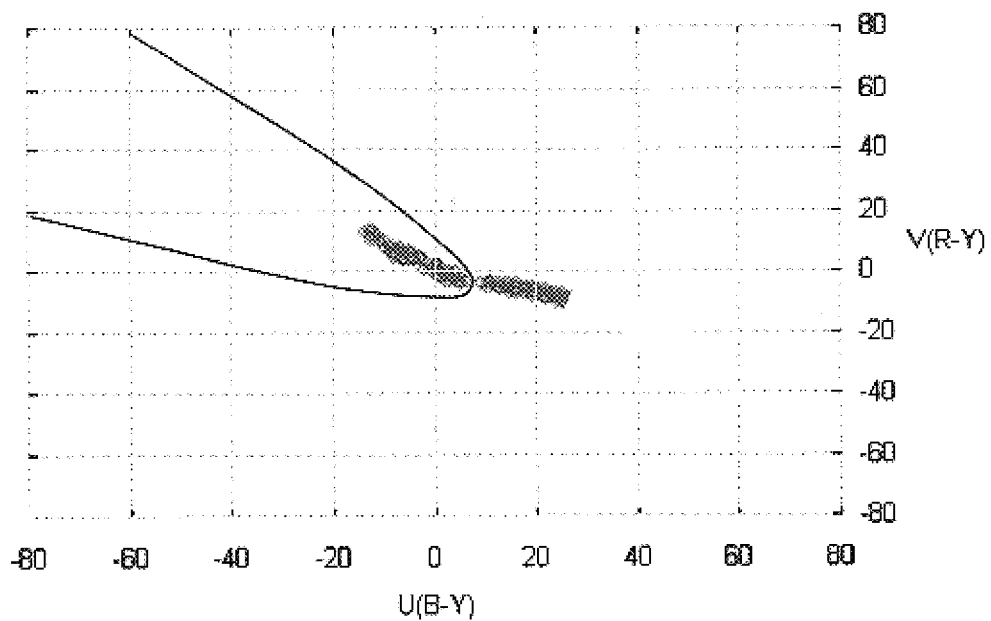
FIG. 10 is a 2D graph that shows a projection of the curved surface in FIG. 9 into 2D plane.

2) After identifying and cutting out background colors by using a two-semi-ellipse cylindrical segment, foreground and transition areas are separated by an arbitrary cylinder, and easily processed in 2D chromatic plane, as shown in FIG. 9 and FIG. 10.

Figure 11:
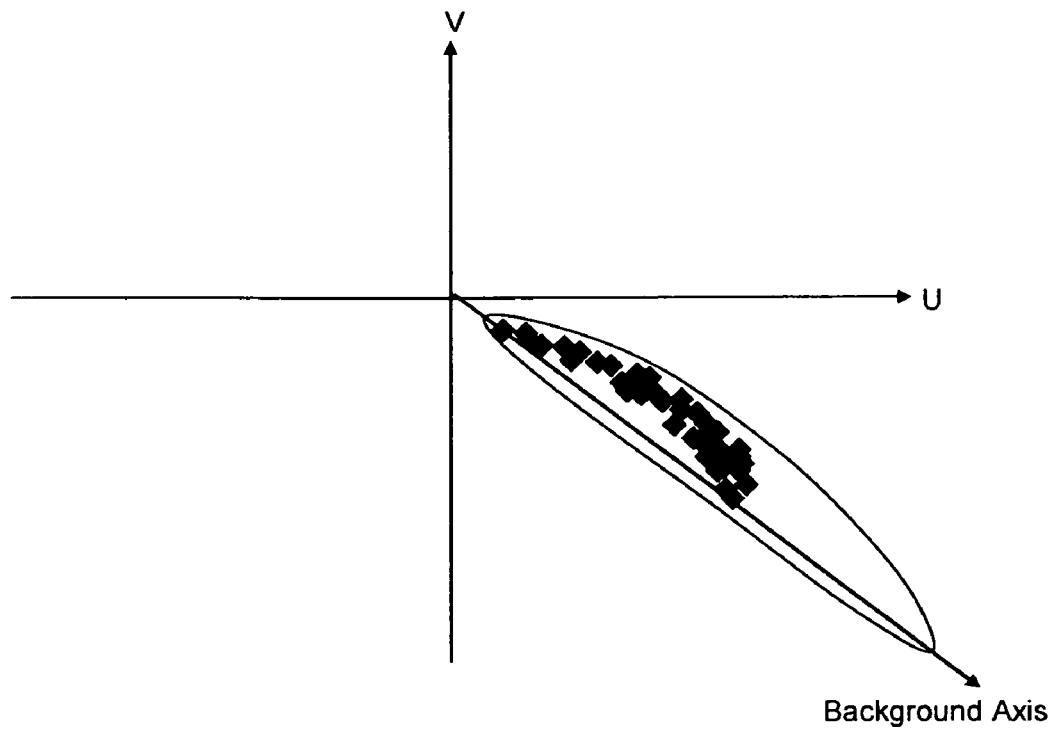
FIG. 11 is a 2D graph that shows how the background colors scatter along the shadow axis.

The exemplary steps are expanded as follows.

a) The wedge shape of the cylindrical segment for shadow areas allows the luma component to be linearly related to chroma component. Implementation becomes simple.

b) Different from a regular geometrical shape such as a sector, circle and ellipse described in the prior art, two semi-ellipses are used in this invention because most of real chromakey pictures show that background colors do not uniformly scatter along the shadow axis. Instead, most of background colors distribute away from axis towards one side as shown in FIG. 11.

c) Underneath the shadow axis are only shadows and solid background colors. It is almost impossible that there are foreground colors beneath the shadow axis. Therefore, it is unnecessary to use a prolate shape such as an oval to wrap background color. A truncated cylinder is enough to confine the shadow color cluster.

d) Different from the prior art, the exemplary method employs higher priority to identify background. Therefore, the foreground region to be defined can overlap the background region because the background region is first picked out and removed from a color space as shown in FIG. 9.

e) The background colors are projected into the shadow axis to generate the alpha signal for a shadow effect in new composite pictures. In YUV space, given a background color $\vec{C}_{bg}=(y_{bg},u_{bg},v_{bg})$ in shadow and the nominal backing color $\vec{C}_{key}=(y_{key},u_{key},v_{key})$ on the shadow axis, alpha generated for $\vec{C}_{bg}$ is given by:

$$\alpha_{shd} = K_{shd}\frac{\vec{C}_{bg} \cdot \vec{C}_{key}}{\vec{C}_{key} \cdot \vec{C}_{key}} \quad (1a)$$

$$= K_{shd}\frac{y_{bg}y_{key} + u_{bg}u_{key} + v_{bg}v_{key}}{y_{key}y_{key} + u_{key}u_{key} + v_{key}v_{key}}$$

where $K_{shd}$ is a scale.

Figure 13A:
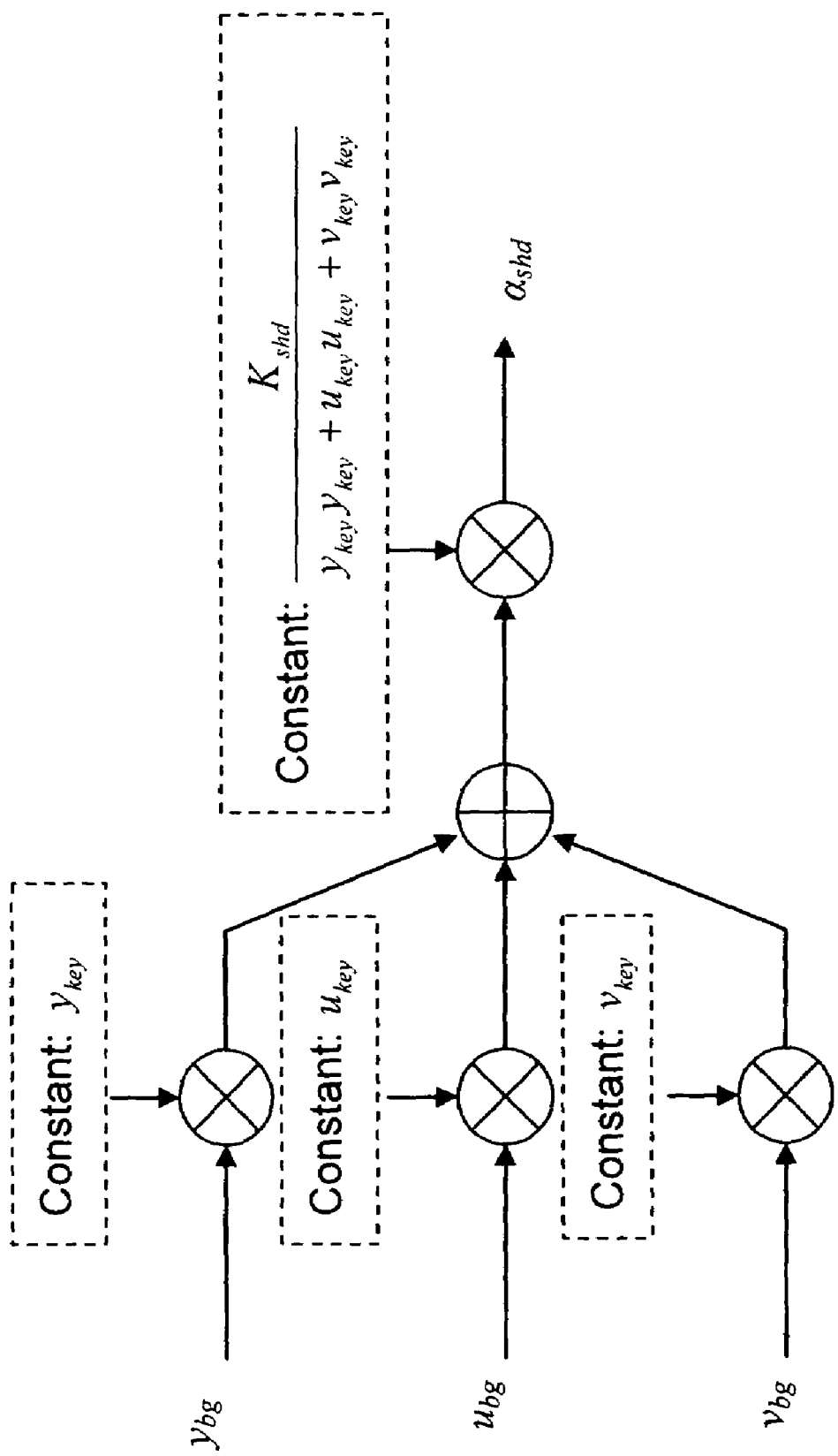
FIGS. 13a-b are block diagrams for implementing functions for forming shadow alpha signals and for forming translucency alpha signals.

In Equation 1a, the denominator is constant when the nominal backing color is found out. FIG. 13a shows a block diagram for implementation of Equations 1a-1b.

f) In theory, $\sqrt{\alpha_{shd}}$ is a theoretic value for alpha but experiments show that $\alpha_{shd}$ in Equation 1a gives better subjective results. If no shadow effect is intended, $\alpha_{shd}$ can be set to constant 1.

g) In an exemplary implementation, Equation 1a can be executed by:

$$\alpha_{shd}=(k_{shd}y_{key})y_{bg}+(k_{shd}u_{key})u_{bg}+(k_{shd}v_{key})v_{bg}. \quad (1b)$$

where $$k_{shd} = \frac{K_{shd}}{\vec{C}_{key} \cdot \vec{C}_{key}}$$

is called shadow factor which can emphasize or de-emphasize shadow effects.

Since $y_{key}$, $u_{key}$, and $v_{key}$ are constant, after finding optimal nominal backing color, $(k_{shd}y_{key})$ $(k_{shd}u_{key})$ and $(k_{shd}v_{key})$ become constants and easily are pre-calculated.

h) The translucency colors are projected into the translucency axis to generate the alpha signal for a translucency effect in new composite pictures. In the YUV space, given the nominal backing color $\vec{C}_{key}=(y_{key}, u_{key}, v_{key})$ and a white light color $\vec{C}_{wht}=(y_{wht}, u_{wht}, v_{wht})$ reflected from a translucent object surface shown in 505 of FIG. 5, the translucency axis is given by $\vec{C}_{tsl}$:

$$\vec{C}_{tsl}=(\vec{C}_{key}-\vec{C}_{wht})=(y_{tsl},u_{tsl},v_{tsl}).$$

Given an observed color $\vec{C}_{bg}=(y_{bg},u_{bg},v_{bg})$ within the translucent area, alpha $\alpha_{tsl}$ generated for the observed color is given by:

$$\alpha_{tsl} = K_{tsl}\frac{(\vec{C}_{bg} - \vec{C}_{wht}) \cdot \vec{C}_{tsl}}{\vec{C}_{tsl} \cdot \vec{C}_{tsl}} \quad (1c)$$

$$= K_{tsl}\frac{(y_{bg}-y_{wht})y_{tsl} + (u_{bg}-u_{wht})u_{tsl} + (v_{bg}-v_{wht})v_{tsl}}{y_{tsl}y_{tsl} + u_{tsl}u_{tsl} + v_{tsl}v_{tsl}}$$

where $K_{tsl}$ is a scale.

Similar to the shadow colors, Equation 1c is simplified as:

$$\alpha_{tsl}=k_{tsl}y_{tsl}(y_{bg}-y_{wht})+k_{tsl}u_{tsl}(u_{bg}-u_{wht})+k_{tsl}v_{tsl}(v_{bg}-v_{wht}) \quad (1d)$$

where $$k_{tsl} = \frac{K_{tsl}}{\vec{C}_{tsl} \cdot \vec{C}_{tsl}}$$

is called translucency factor which can emphasize or de-emphasize translucency effects.

Figure 13B:
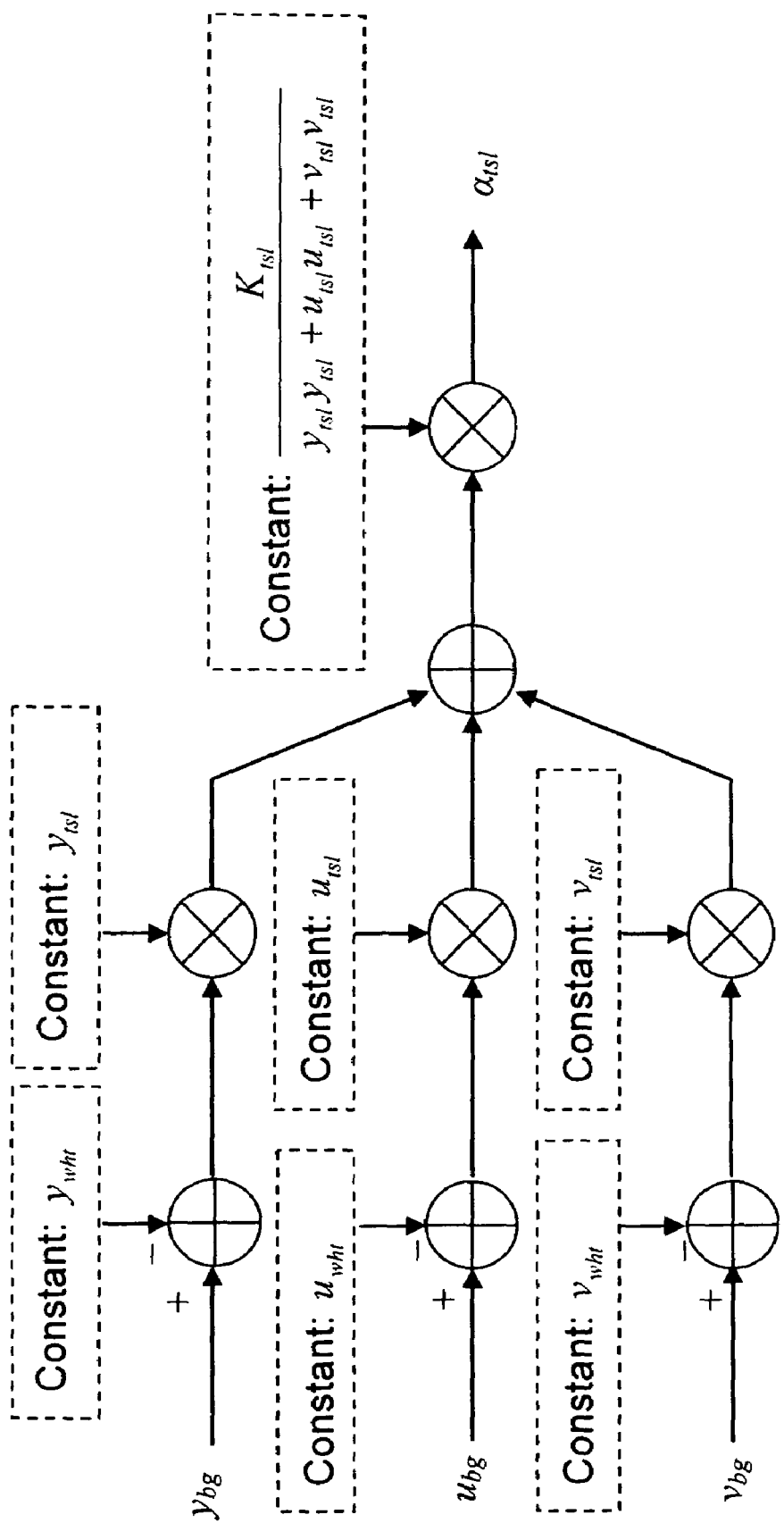

Since $y_{tsl}$, $u_{tsl}$, and $v_{tsl}$, are constant after finding optimal nominal backing color, $(k_{tsl}y_{tsl})(k_{tsl}v_{tsl})$ and $(k_{tsl}/v_{tsl})$ become constants and easily are pre-calculated.

i) Similar to the shadow alpha, $\sqrt{\alpha_{tsl}}$ is a theoretic value for alpha but an exemplary implementation can directly use $\alpha_{tsl}$ in Equations 1c-1d. If no translucency effect is intended, $\alpha_{tsl}$ can be set to a constant 1 for complete transparence or 0 for no transparence at all. FIG. 13b shows a block diagram for implementation of Equations 1c-1d.

Figure 12:
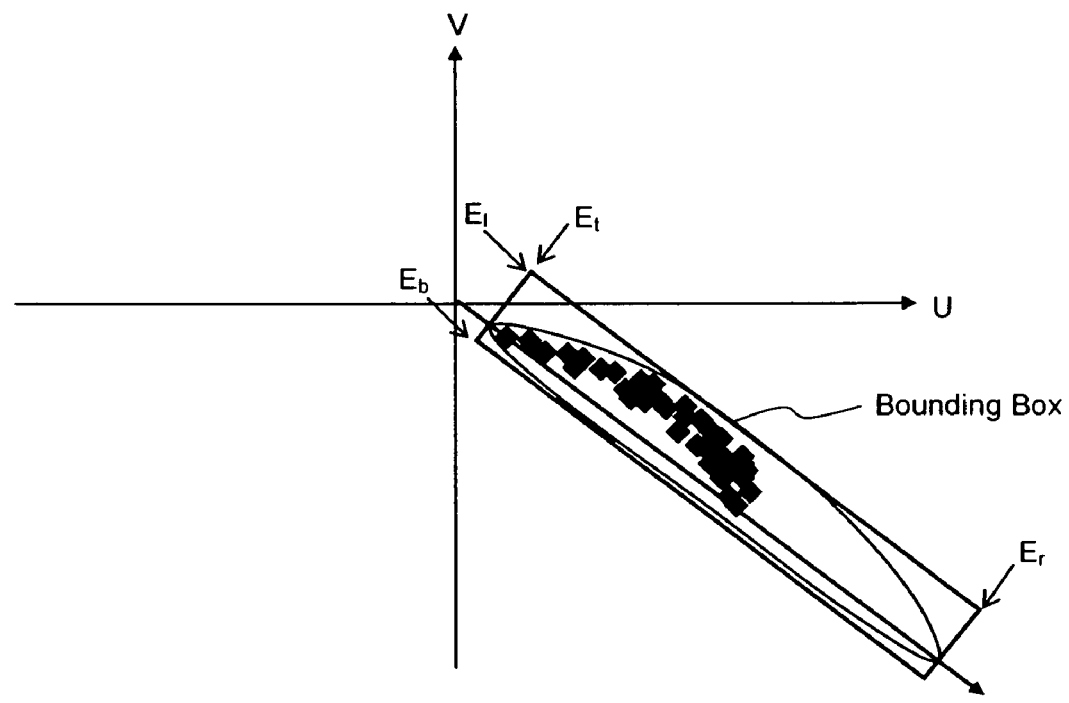
FIG. 12 is a 2D graph that shows the bounding box defined by the present invention.

The next method used in this invention is to automatically determine the parameters for the geometrical shapes defined by the preceding method. The present invention introduces another term bounding rectangle or bounding box which confines the background color to a rectangle area. By finding the bounding rectangle, we can easily find two semi-ellipses as shown in FIG. 12.

The present invention for determination of range stands on the following facts and observations.

1) The nominal backing color is most likely a background color with high saturation. In other words, a color on the shadow axis and far away from the origin has a high likelihood of being the nominal backing color. If given an initial estimation of alpha where alpha equal to unit represents 100% background, a color with a high value of alpha has a high likelihood of being background color.

2) Given a initial estimation of alpha, a color with a high value of alpha and far away from the shadow axis has a high likelihood of being a background color on an edge of the bounding box.

Figure 14:
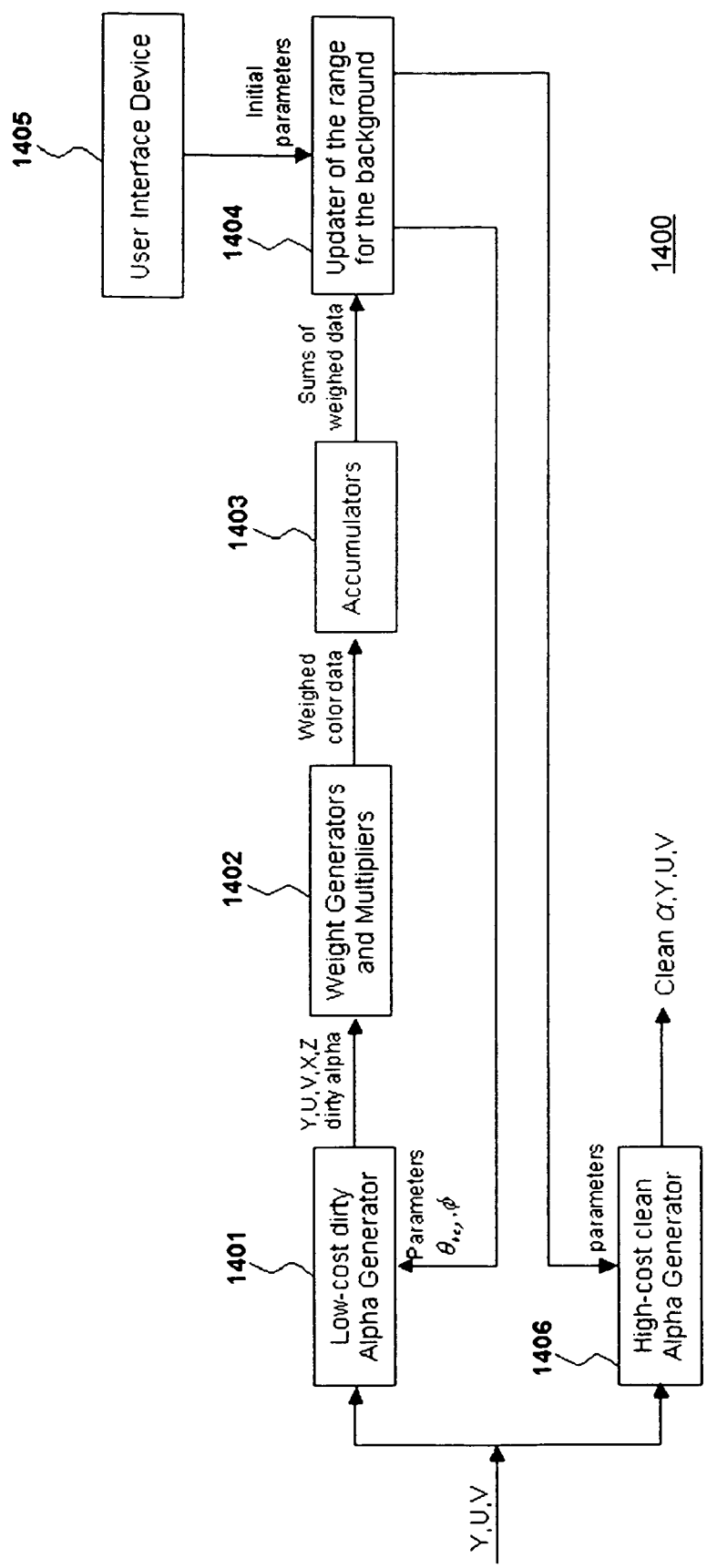
FIG. 14 is a block diagram that shows the main functions and implementation flow of the present invention.

Fact 1 directs us to find out the backing color and Fact 2 helps us to find out the bounding box. FIG. 14 shows a block diagram for the exemplary method. The exemplary method 1400 in FIG. 14 starts with a low-cost dirty alpha estimator 1401, which is either a low-cost standalone device or an intermediate result from a complex and high-cost clean alpha estimator 1406. The value generated by the low-cost dirty alpha estimator 1401 forms parts of weights that weigh each color component later. Another part of a weight is a distance from a color of interest to the shadow axis or the nominal backing color. Component 1402 generates weight values and multiplies the weights with corresponding color components such as luma Y and chroma U and V signals. Component 1403 accumulates each weighed color component as well as each weight and then sends them to Component 1404. Component 1404 uses the accumulated data to calculate the parameters for the nominal backing color and the bounding box. The calculation results from 1404 are sent back to 1401, 1402, and 1403 for repeated calculation. Notice that components 1401, 1402, 1403, and 1404 construct a close loop. There are two situations for such a repeated calculation (or closed loop), referenced to FIG. 15.

Situation 1: occurs as recursive calculation during initialization. In theory, when initial parameters are sent to the closed loop, the recursive calculation is implemented until the results are convergent. In an exemplary implementation, 3 times repeated calculation can be employed and results are quite satisfactory.

Situation 2: occurs as dynamic data collection after initialization and during chromakey processing on the fly. Every a frame or multiple frames, parameters are updated.

Figure 15:
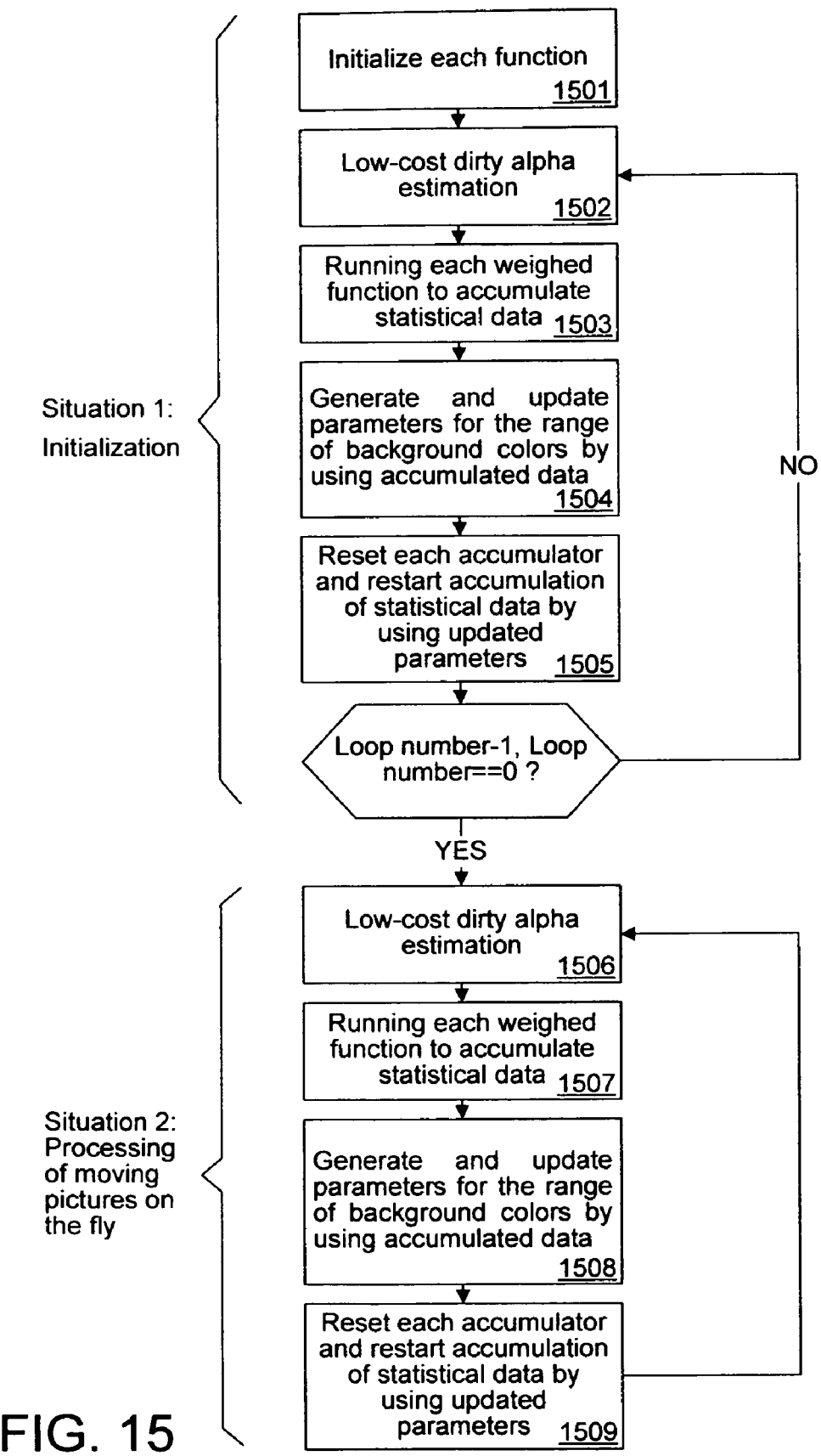
FIG. 15 is a flow chart that shows the implementation flow of the present invention.
Figure 16:
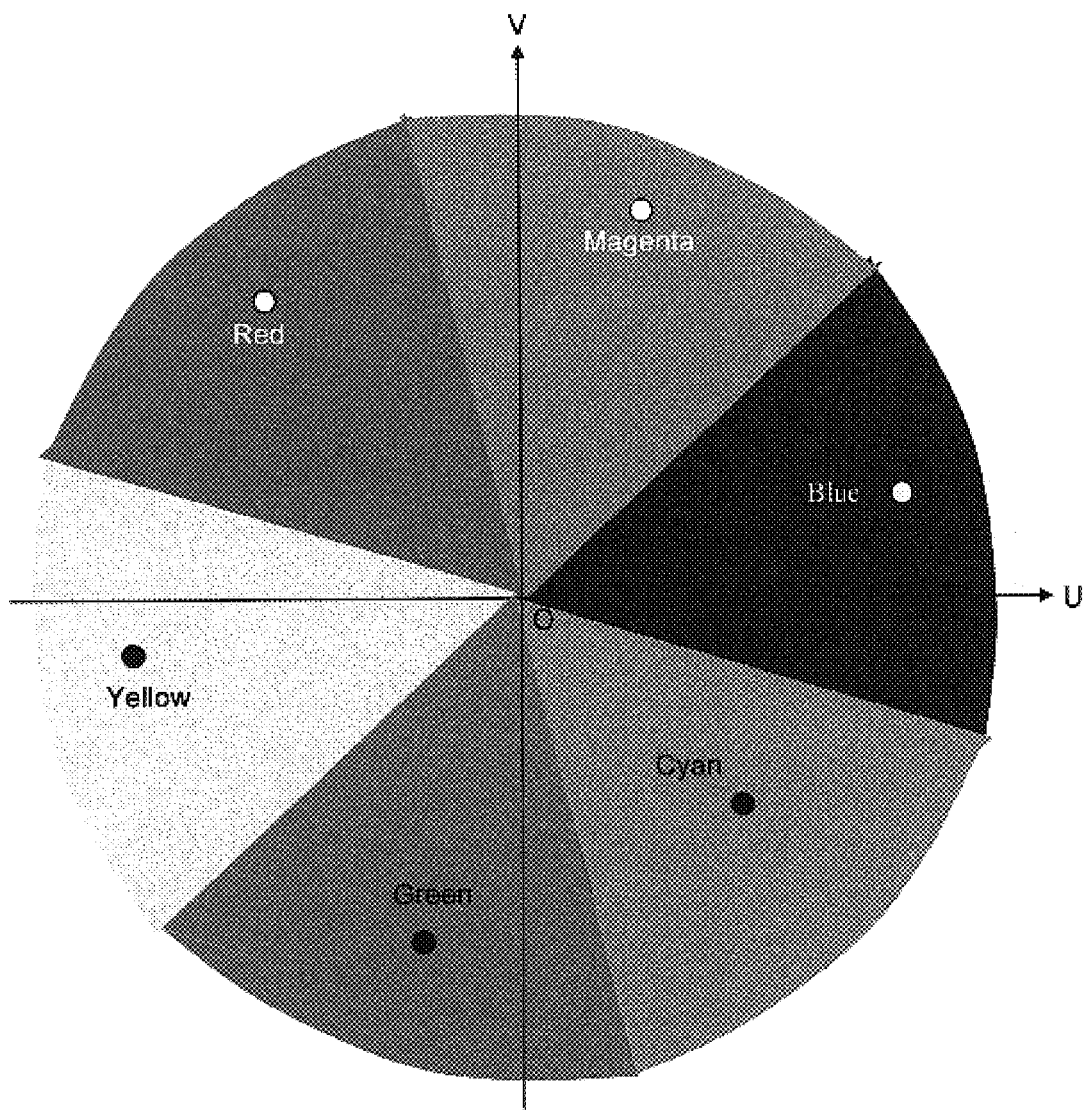
FIG. 16 is a 2D graph that shows six initial color sectors used by the present invention.

Initialization 1501 in FIG. 15 includes a process that a chromatic UV plane is divided into six sectors as shown in FIG. 16. The six sectors have their centroid of colors individually: red, green, blue, yellow, cyan and magenta. Each sector has a central angle of 60°. A user can pick one of six colors as an initial backing color. In other words, a sector is supposed to roughly match the real background. An initial value for the nominal backing color is the centroid color of a user-picked sector.

One example for implementation of the low-cost dirty alpha estimator 1401 is described as follows. Given the nominal backing color with chroma vector $(u_{key}, v_{key})$, any input color with chroma vector $(u,v)$ in UV plane is transferred into $(x,z)$ in XZ plane by rotation with angle $\theta_{key}$.

$$\theta_{key} = \tan^{-1}(v_{key}/u_{key}). \quad (2)$$

$$\begin{cases} x = u \times \cos(\theta_{key}) - v \times \sin(\theta_{key}), \\ z = u \times \sin(\theta_{key}) + v \times \cos(\theta_{key}). \end{cases} \quad (3)$$

And the norm of the nominal backing color is:

$$N_{key} = \|\vec{C}_{key}\| = \sqrt{u^2+v^2}. \quad (4)$$

Figure 17:
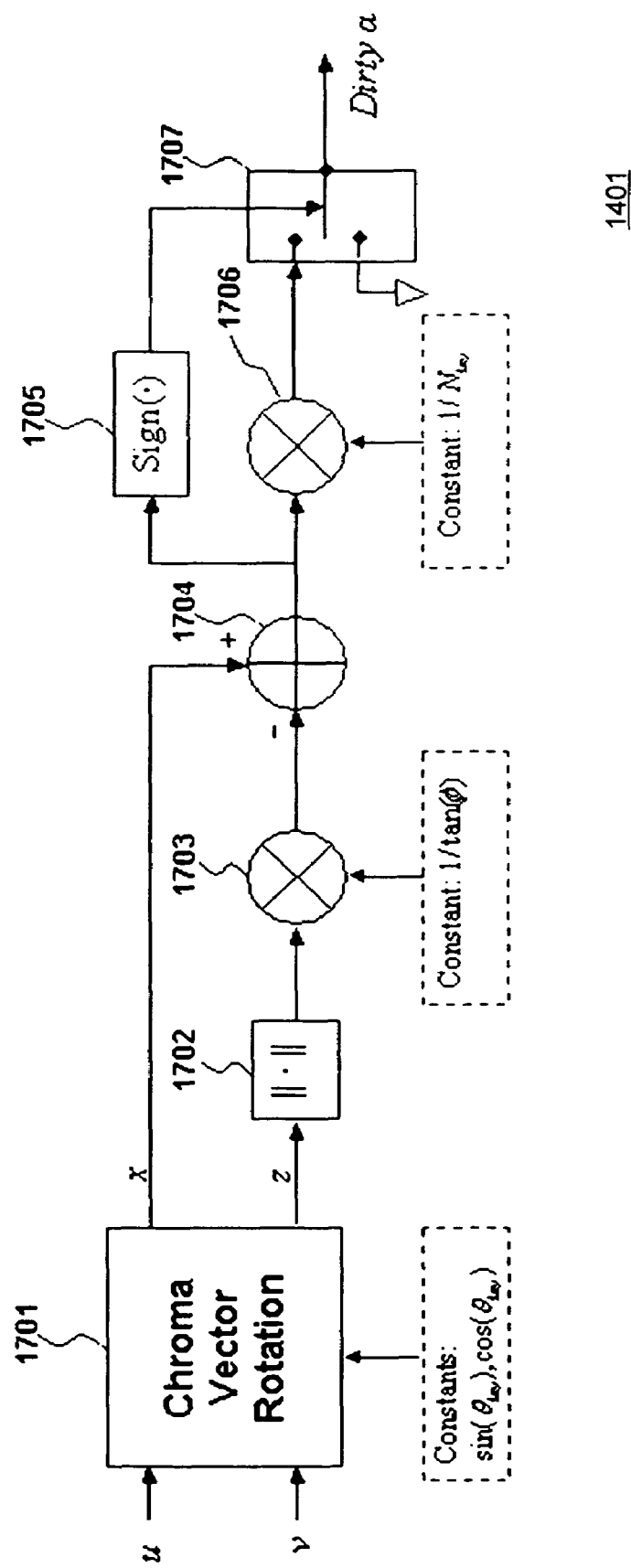
FIG. 17 is a block diagram that shows a sample of how to implement a low-cost dirty alpha estimation.

And then:

$$\alpha = \begin{cases} \dfrac{(x - |z|\tan^{-1}(\phi))}{N_{key}} & x > |z|\tan^{-1}(\phi) \\ 0 & \text{else} \end{cases} \quad (5)$$

where $\phi$ is a parameter which defines a range of background colors in the low-cost dirty alpha estimator. Initial value of $\phi$ is the half of central angle of a sector. FIG. 17 shows the diagram of this example.

Elements 1402, 1403 and 1404 implement the following functions.

1) Calculation for the Nominal Backing Color $\vec{C}_{key}$

We first define a saturation-related measure: the norm difference $\Delta_k$ between an input chromatic vector $\vec{C}$ and the initial nominal backing color vector $\vec{C}_{key}^{\,0}$.

$$\Delta_k = \|\vec{C}\| - \|\vec{C}_{key}^{\,0}\| \quad (6)$$

The weight generator 1402 forms a weight $w_{key}$ when $\Delta_k > 0$, $$w_{key} = \alpha \times \Delta_k, \quad (7)$$

where weight $w_{key}$ consists of two fractions, $\alpha$ from the low-cost dirty alpha estimator 1401 and $\Delta_k$ from norm difference. The high value of $\alpha$ means the high likelihood of being background colors and the high $w_{key}$ means the high saturation.

Then the accumulator 1403 collects weighed data and weights pixel by pixel. Finally, the updater 1404 finds the new nominal backing color by:

$$\vec{C}_{key} = \frac{\sum w_{key}\vec{C}}{\sum w_{key}}, \quad (8)$$

If $\sum w_{key} = 0$, $\vec{C}_{key}$ is $\vec{C}_{avg}$ shown in Equation 18.

2) Calculation for the Maximum Departure from the Nominal Backing Color Along the Shadow Axis When $\Delta_k < 0$ in Equation 6, we define a weight $w_{left}$ $$w_{left} = \alpha_{left} \times \Delta_k \quad (9)$$

where $\alpha_{left}$ is derived from $\alpha$ to emphasize colors in shadow areas.

$$\alpha_{left} = \begin{cases} \alpha/T_{shadow} & 0 < \alpha < T_{shadow} \\ (\alpha - T_{shadow})/T_{shadow} & T_{key} < \alpha < 2T_{shadow} \\ 0 & \text{else} \end{cases} \quad (10)$$

where $T_{shadow}$ is a threshold for shadow range. If no shadow exists, $T_{shadow}$ can be set as 1; otherwise as 0.2; Weight $w_{left}$ consists of two factors. The large absolute of $\Delta$ ($<0$) has high likelihood of being shadow colors.

The maximum departure $\vec{C}_{left}$ due to shadows is calculated by:

$$\vec{C}_{left} = \frac{\sum w_{left}\vec{C}}{\sum w_{left}} \quad (11)$$

3) Calculation for the Maximum Departure from the Shadow Axis

To measure the departure from the shadow axis, we define a distance $\delta$ as the distance from an input chroma vector $\vec{C}$ to the nominal shadow axis $\vec{C}_{key}$.

An easy way to calculate $\delta$ is to use the chromatic vector in XZ plane as shown in 1). From Equation 3, we immediately have:

$$\delta = z. \quad (12)$$

When $\delta > 0$, we define a weight for maximum departure above the shadow axis as:

$$w_{up} = \alpha \times \delta \quad (13)$$

The maximum departure is found by using 1402, 1403 and 1404:

$$\vec{C}_{up} = \frac{\sum w_{up} \vec{C}}{\sum w_{up}} \quad (14)$$

When $\delta<0$, we define a weight for maximum departure below the shadow axis as:

$$w_{dn} = \alpha \times \delta, \quad (15)$$

the maximum departure is found by:

$$\vec{C}_{dn} = \frac{\sum w_{dn} \vec{C}}{\sum w_{dn}}, \quad (16)$$

4) Calculation for Average of Chroma Components

Another set of parameters is the statistical means of chroma vectors.

$$w_{avg} = \alpha \times \delta \quad (17)$$

$$\vec{C}_{avg} = \frac{\sum w_{avg} \vec{C}}{\sum w_{avg}} \quad (18)$$

5) Calculation for the Bounds of the Bounding Box

The bounding box is defined by four parameters as shown in FIG. 12, left boundary $E_l$, right boundary $E_r$, top boundary $E_t$, and bottom boundary $E_b$. By using $\vec{C}_{key}$, $\vec{C}_{key}^{\,0}$, $\vec{C}_{left}$, $\vec{C}_{up}=(x_{up},z_{up})$, $\vec{C}_{dn}=(x_{up},z_{up})$, parameters for the bounding box are represented by:

$$E_l = 0.9 \times \frac{\left\|\vec{C}_{left}\right\| \times \left\|\vec{C}_{key}^{\,0}\right\|}{\left\|\vec{C}_{key}\right\|} \quad (19)$$

$$E_r = 2 \times \left\|\vec{C}_{key}^{\,0}\right\| - E_l \quad (20)$$

$$E_t = a \times \frac{|x_{up} - N_{key}^0|}{b*(N_{key}^0 - E_l) + c} \times z_{up} \quad (21)$$

$$E_b = a \times \frac{|x_{dn} - N_{key}^0|}{b*(N_{key}^0 - E_l) + c} \times z_{dn} \quad (22)$$

where parameters a, b, c are constants. In one embodiment, they are set as 2.0, 5.0, 2.0 based on the experiments, respectively.

6) Calculation for the Offset of Tilted Plane

Figure 18:
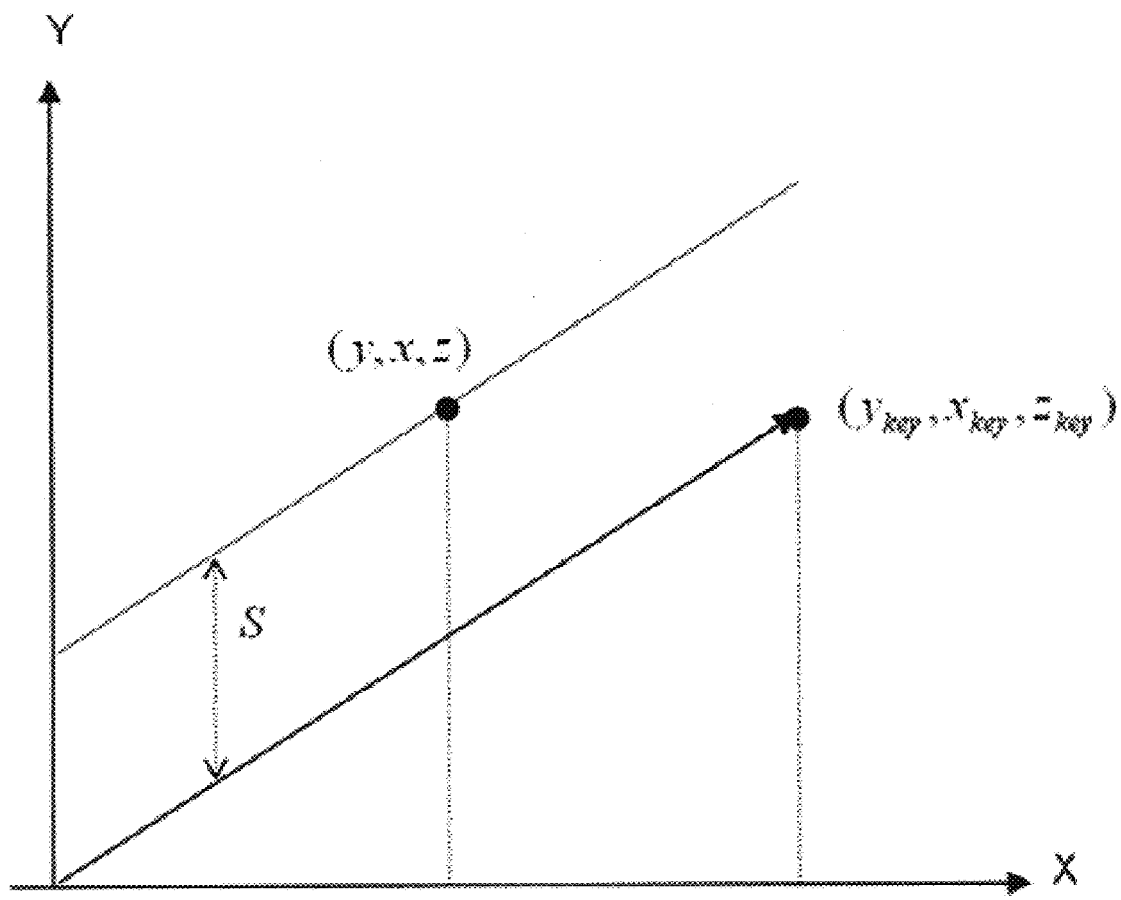
FIG. 18 is a 2D graph that defines a distance measure or shift in XY plane for a color with luma y and chroma (x,z) to the shadow axis.

Referenced to FIG. 18, we first define a distance measure from a color with luma y and chroma (x,z) in XZ plane as:

$$\Delta_y = y - \frac{y_{key}}{x_{key}} \times x \quad (23)$$

When $\Delta_y > 0$, the weight is defined as:

$$w_y = \alpha \times \Delta_y. \quad (24)$$

The offset is set as:

$$S = \frac{\sum w_y \Delta_y}{\sum w_y}, \quad (25)$$

7) Calculation for the Two-Semi-Ellipse Cylindrical Segment

There lookup tables are generated for the wedged cylinder by using $E_l$, $E_b$, $E_t$, $E_b$, S, and $\vec{C}_{key}$.

Figure 19:
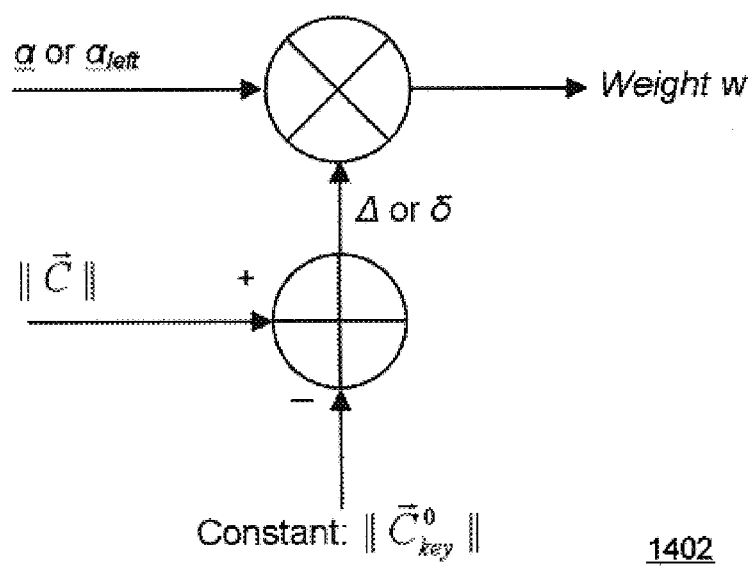
FIG. 19 is a block diagram that generates weight signals.
Figure 20:
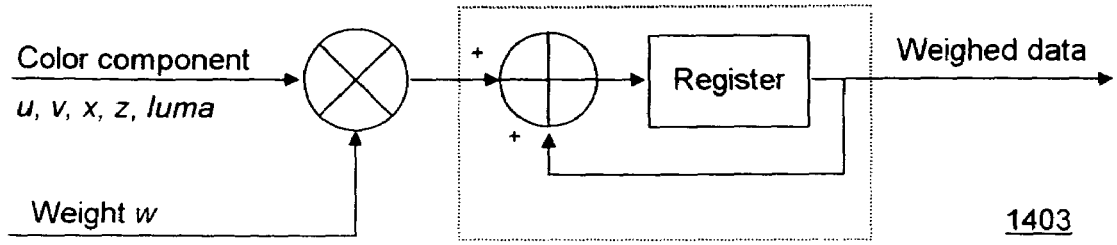
FIG. 20 is a block diagram that implements accumulation of weighed color components.
Figure 21:
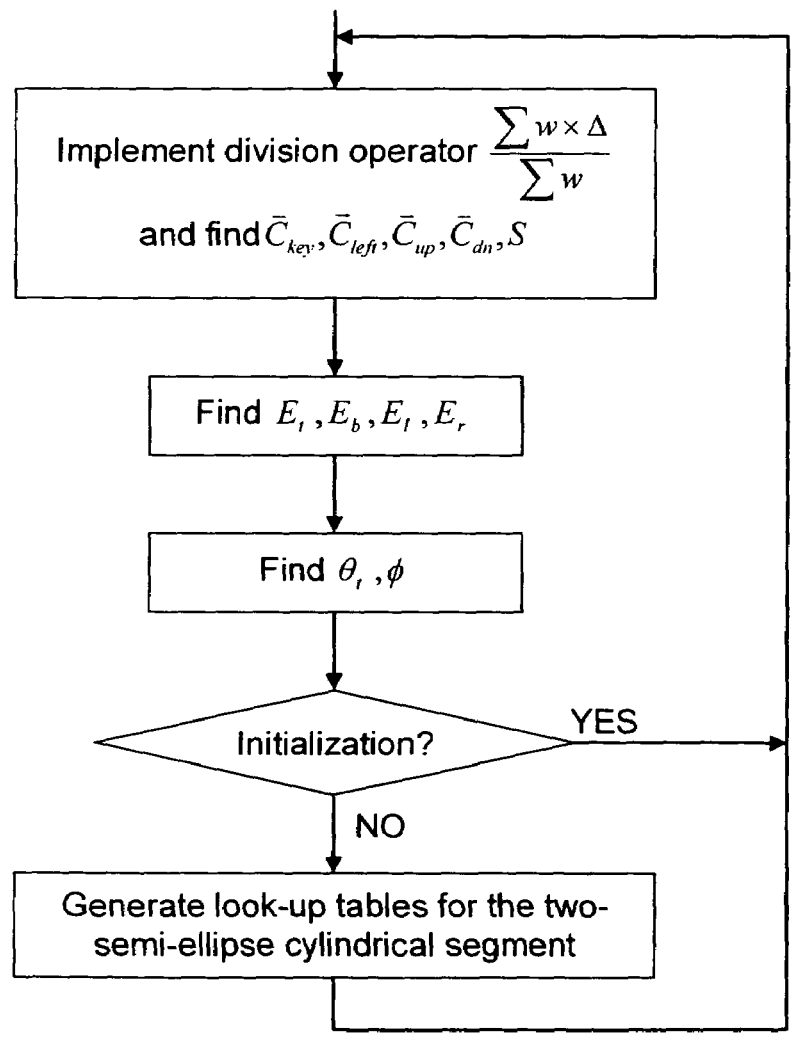
FIG. 21 is a flow chart that shows a procedure of updating parameters for background colors.

According to the exemplary embodiments:

a) Equations 6, 7, 8, 9, 12, 13, 15, 17, 23 and 24 form the weights for different purposes and are implemented in 1402 of FIG. 14. They are pixel-based operations which can be running on every pixel. FIG. 19 shows an embodiment of 1402.

b) The operator (accumulator) in Equations 8, 11, 14, 16 and 25 is implemented in 1403 of FIG. 14. They are also pixel-based operations. FIG. 20 shows an embodiment of 1403.

c) 1404 of FIG. 14 implements the division operator in Equations 8, 11, 14, 16, and 25 as well as Equations 19, 20, 21 and 22. They run one time at each end of accumulations. FIG. 21 shows an embodiment of 1404.

d) Embodiments of 1401, 1402, 1403, 1404, and 1045 can be realized either in an entire software environment or in a mixture of hardware and software.

e) One embodiment of 1400 in FIG. 14 is that a hardware device such as FPGA/PLD implements pixel-based functions 1401, 1402 and 1403, while software supported by a microprocessor implements functions 1404 and 1405.

Figure 22A:
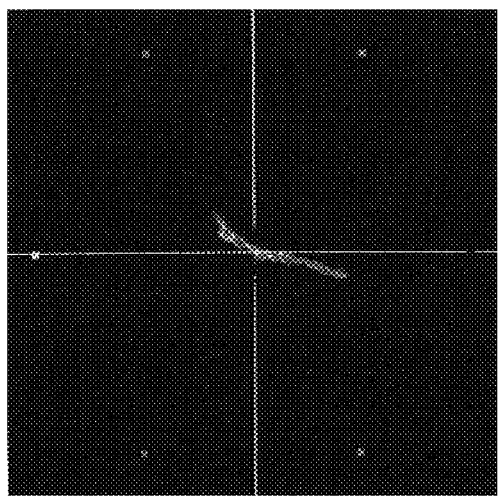
FIGS. 22a-d are graphs that show the results produced by the present invention.
Figure 22B:
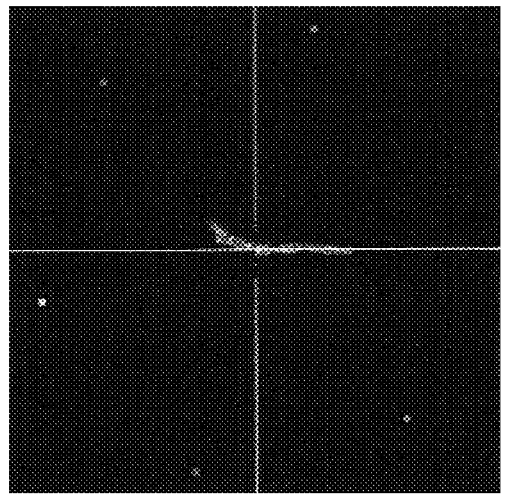

We show herein three of our experimental results from the exemplary method. The first experiment works on a picture shown in FIG. 2. FIG. 22*a-b* shows the process during which the exemplary method gradually finds out the best nominal backing color and the background range. Notice that 1) FIG. 22 shows results in 2D chromatic plane for convenience; and 2) three colors in color clusters show different ranges of pixel numbers: gray for [0,255], red for [255, $255^2$], and yellow for [$255^2$, $255^3$].

In the initial state, a user determines one of six principal colors. Due to a blue background in FIG. 2, the nominal backing color is used to determine an initial color shown in FIG. 22*a* where the shadow axis is through the principal color blue. FIG. 22*b* shows the result from the first time calculation. The nominal backing color is modified to approach the real one.

Figure 22C:
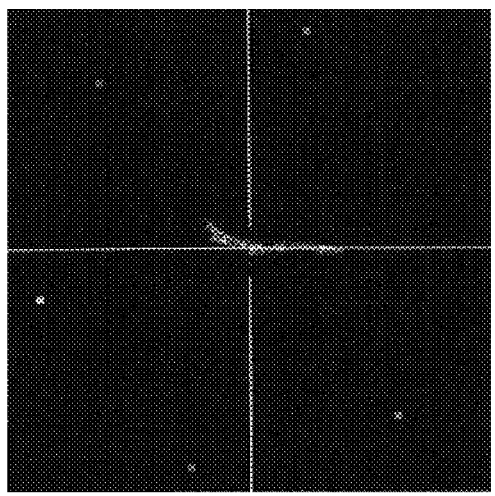

FIG. 22*c* shows the second time calculation result where the nominal backing color is found out and the range of background colors are confined by two semi-ellipses with the same center.

Figure 22D:
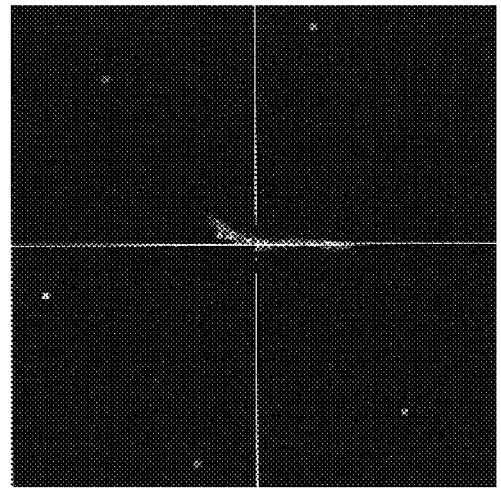
Figure 23:
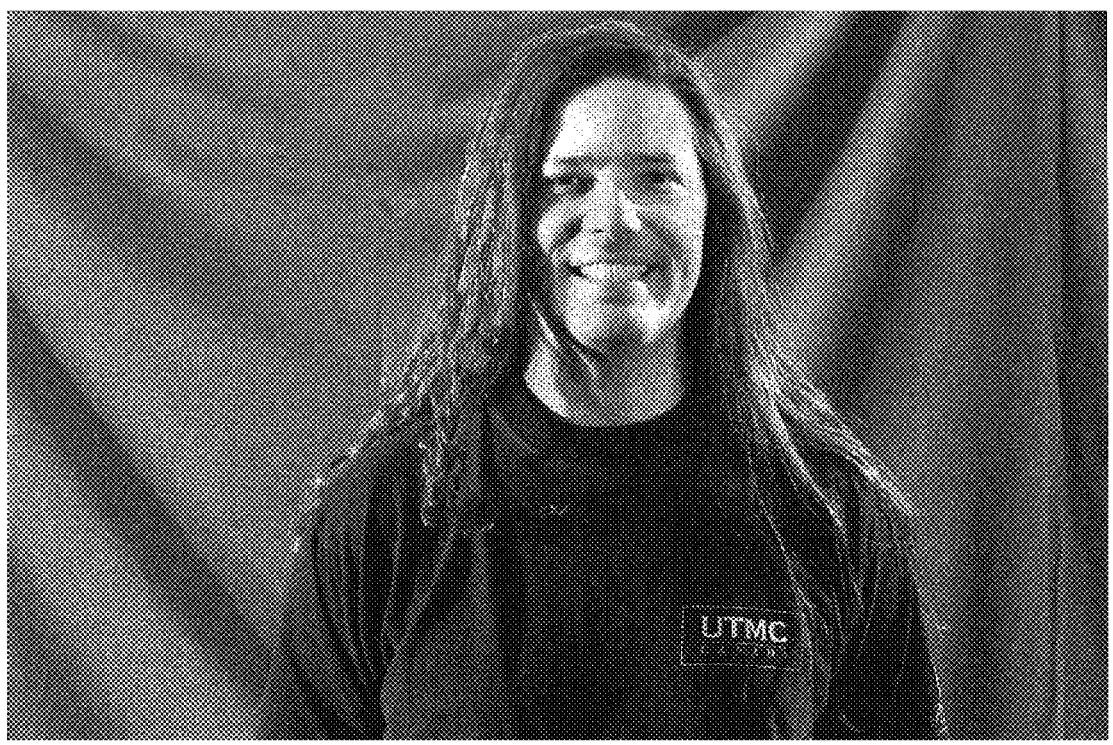
FIG. 23 is the 2nd picture used for experimentation by the present invention.
Figure 24:
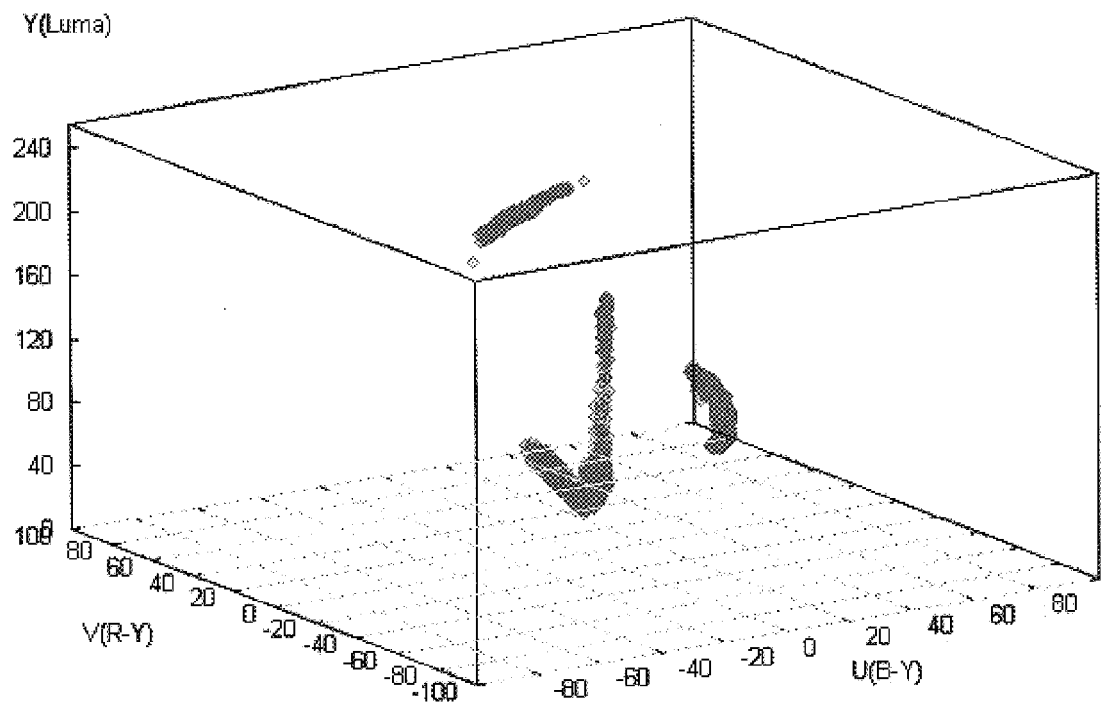
FIG. 24 is a 3D graph that shows color distributions collected from the picture in FIG. 23.
Figure 25:
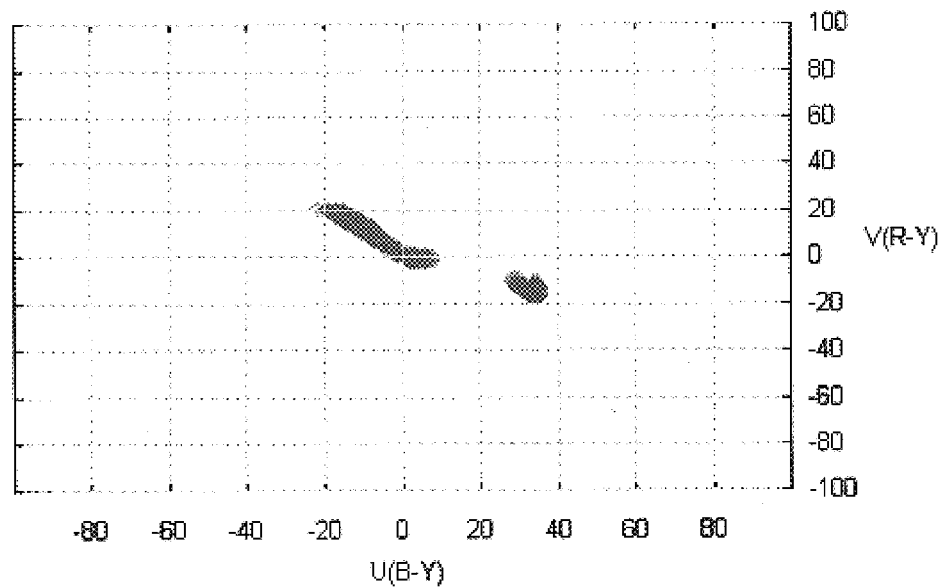
FIG. 25 is a 2D graph that shows a projection of a 3D graph in FIG. 24 onto a 2D chromatic plane.
Figure 26A:
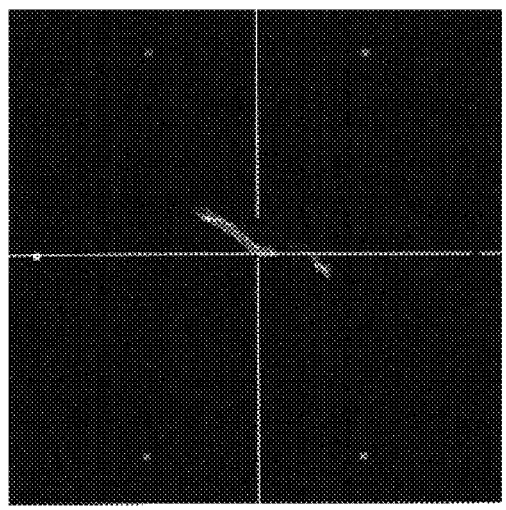
FIG. 26a-d are graphs that show the results for the picture in FIG. 23 by using the present invention.
Figure 26B:
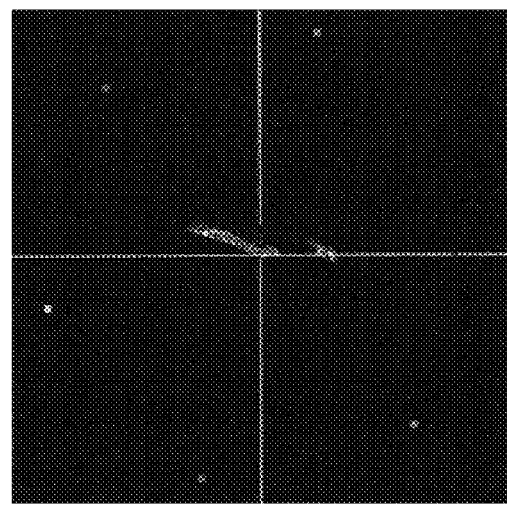
Figure 26C:
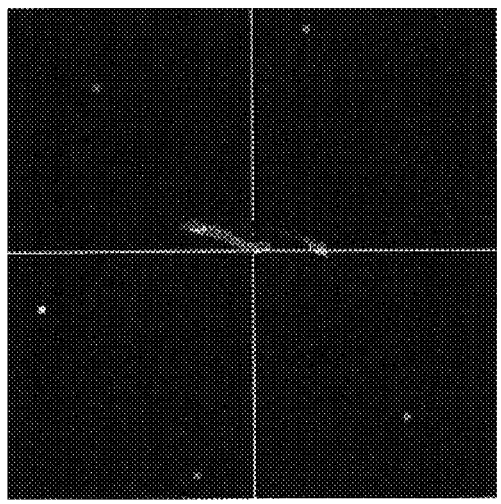
Figure 26D:
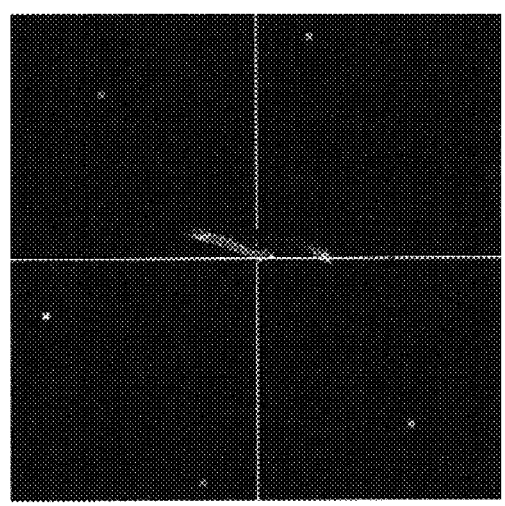

FIG. 22*d* shows the third time calculation result where the closed boundary curve restricts the background cluster tightly. The second experiment works on a picture in FIG. 23 where a subject is shot against a blue wrinkled backdrop without uniform lights. Apparently, the shadow behind the subject has the same colors as the ones around the picture borders. The background clusters in 3D color space is shown in FIG. 24. Projection of the clusters from 3D space into 2D plane is shown in FIG. 25.

FIG. 26 shows how the exemplary method tracks down the background color range.

Figure 27:
FIG. 27 is the 3rd picture used for experiments by the present invention.
Figure 28:
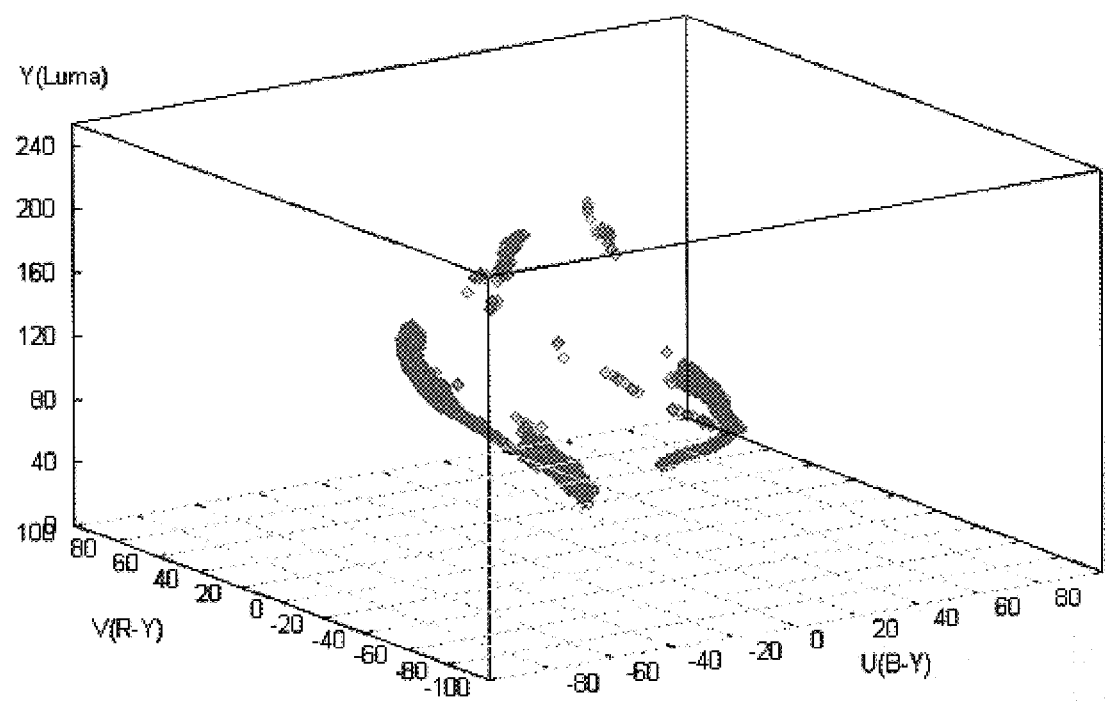
FIG. 28 is a 3D graph that shows color distributions collected from the picture in FIG. 27.
Figure 29:
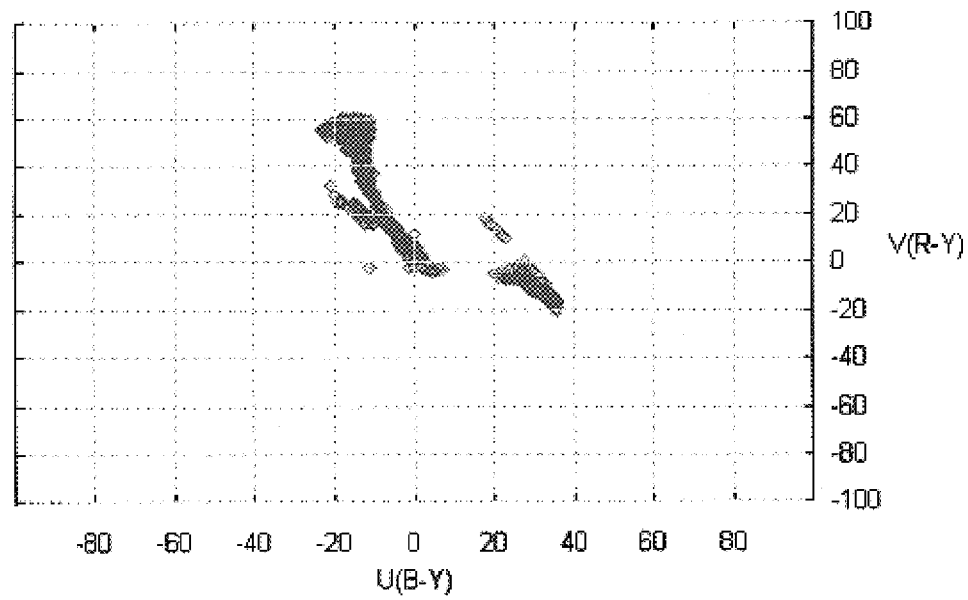
FIG. 29 is a 2D graph that shows a projection of the 3D graph in FIG. 27 onto a chromatic plane.
Figure 30A:
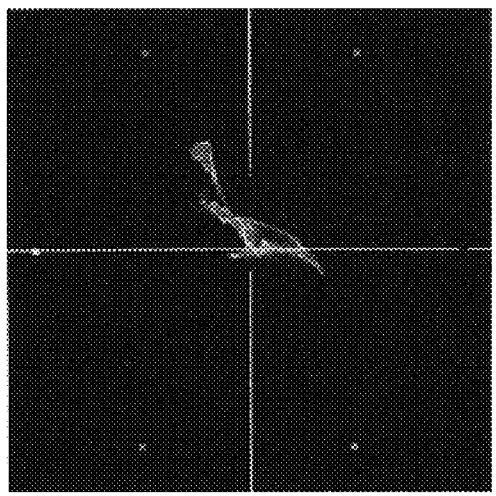
FIGS. 30a-d are graphs that show the results for the $3^{rd}$ picture in FIG. 27 by using the present invention.
Figure 30B:
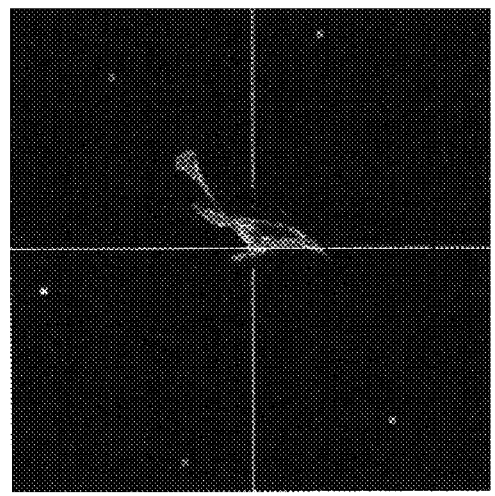
Figure 30C:
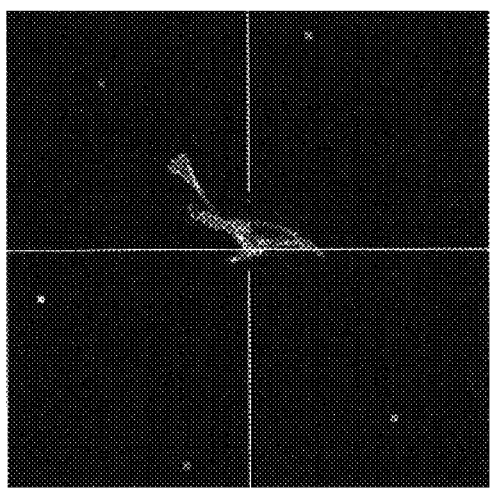
Figure 30D:
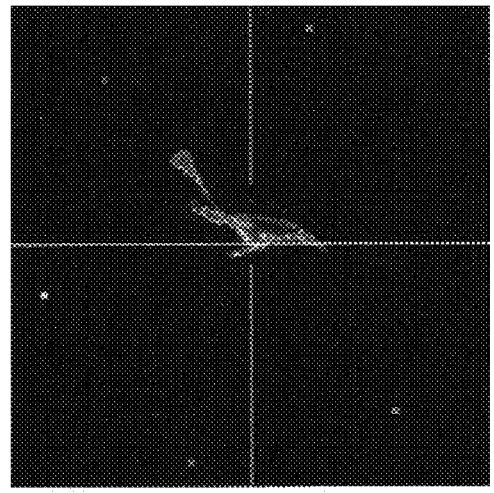

The third experiment works on a picture shown in FIG. 27. FIG. 28 and FIG. 29 show color distributions in 3D space and 2D plane respectively. FIG. 30 shows the process of tracking down the background range automatically.

Figure 31:
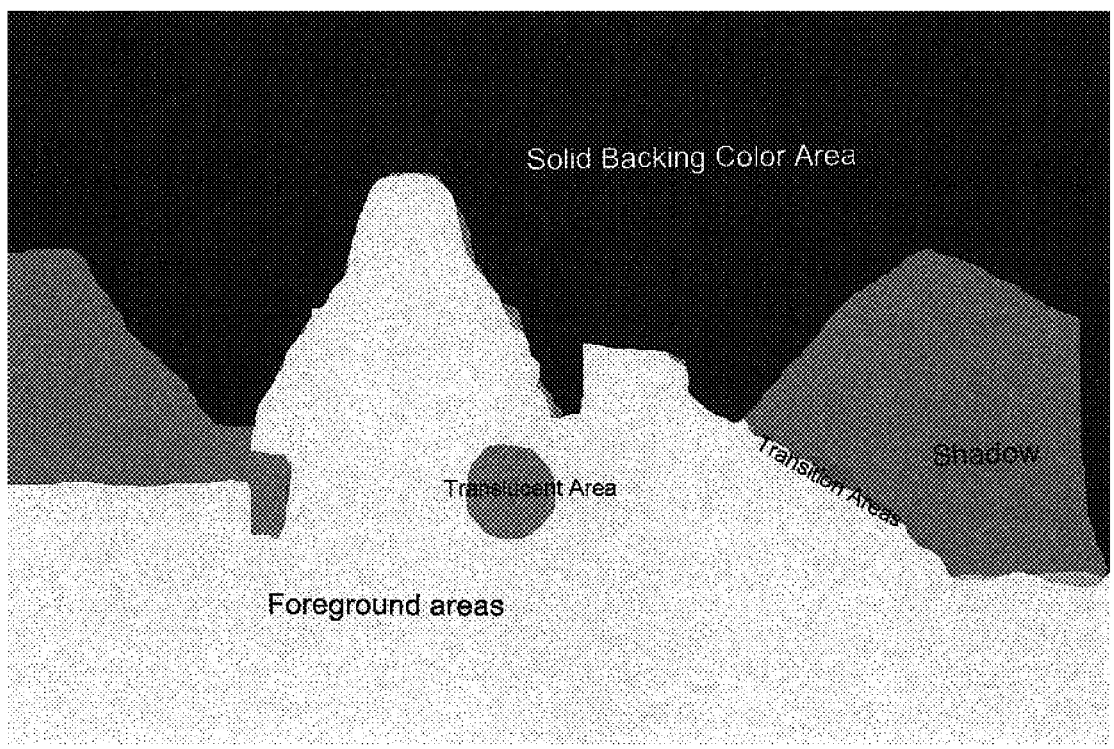
FIG. 31 is an example of the area map derived from the picture shown in FIG. 27.

Further exemplary embodiments can be used to produce an area map which displays different areas classified by the 3D volumes. With aid of the area map, a chromakey operator can quickly tune the parameters which are automatically determined by using Equations 2-25 when the automatic determination cannot achieve perfect results. An area map uses multiple colors to label different areas on a foreground chromakey picture. One embodiment of the present invention uses five colors to label 1) solid backing color area, 2) foreground object areas, 3) shadow area, 4) translucent area, 5) transition area outside the four preceding areas. FIG. 31 shows an area map for a picture shown in FIG. 27.

The exemplary embodiment of implementing the area map is to label each pixel with one of the five areas during the process of identification and classification with 3D volumes.

Although the exemplary area map uses five colors for five areas, in further exemplary embodiments an area map need not be restricted to the 5 areas. For example, we could uniquely identify different transparency regions on multiple translucency axes, and so on.

Although the exemplary embodiments described with respect to FIGS. 1-31 are mainly represented in color space YUV, the exemplary embodiments can be employed for different chromaticity expressions such as YPrPb defined by SMPTE 274M for HDTV [13], YIQ for NTSC system, HSL for common video processing system, and so on. An exemplary device based on the present invention can be thought as a chromaticity-free tool. This is because the present invention uses a recursive algorithm which has a good convergence no matter what expression input color data use.

The devices and subsystems of the exemplary embodiments described with respect to FIGS. 1-31 can communicate, for example, over a communications network, and can include any suitable servers, workstations, personal computers (PCs), laptop computers, PDAs, Internet appliances, set top boxes, modems, handheld devices, telephones, cellular telephones, wireless devices, other devices, and the like, capable of performing the processes of the disclosed exemplary embodiments. The devices and subsystems, for example, can communicate with each other using any suitable protocol and can be implemented using a general-purpose computer system, and the like. One or more interface mechanisms can be employed, for example, including Internet access, telecommunications in any suitable form, such as voice, modem, and the like, wireless communications media, and the like. Accordingly, the communications network can include, for example, wireless communications networks, cellular communications networks, satellite communications networks, Public Switched Telephone Networks (PSTNs), Packet Data Networks (PDNs), the Internet, intranets, hybrid communications networks, combinations thereof, and the like.

As noted above, it is to be understood that the exemplary embodiments, for example, as described with respect to FIGS. 1-31, are for exemplary purposes, as many variations of the specific hardware and/or software used to implement the disclosed exemplary embodiments are possible. For example, the functionality of the devices and the subsystems of the exemplary embodiments can be implemented via one or more programmed computer systems or devices. To implement such variations as well as other variations, a single computer system can be programmed to perform the functions of one or more of the devices and subsystems of the exemplary systems. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, for example, to increase the robustness and performance of the exemplary embodiments described with respect to FIGS. 1-31.

The exemplary embodiments described with respect to FIGS. 1-31 can be used to store information relating to various processes described herein. This information can be stored in one or more memories, such as a hard disk, optical disk, magneto-optical disk, RAM, and the like, of the devices and sub-systems of the exemplary embodiments. One or more databases of the devices and subsystems can store the information used to implement the exemplary embodiments. The databases can be organized using data structures, such as records, tables, arrays, fields, graphs, trees, lists, and the like, included in one or more memories, such as the memories listed above.

All or a portion of the exemplary embodiments described with respect to FIGS. 1-31 can be conveniently implemented using one or more general-purpose computer systems, microprocessors, digital signal processors, micro-controllers, and the like, programmed according to the teachings of the disclosed invention. Appropriate software can be readily prepared by programmers of ordinary skill based on the teachings of the disclosed exemplary embodiments. In addition, the exemplary embodiments can be implemented by the preparation of application-specific integrated circuits or by interconnecting an appropriate network of component circuits.

While the present invention have been described in connection with a number of exemplary embodiments and implementations, the present invention is not so limited but rather covers various modifications and equivalent arrangements, which fall within the purview of the appended claims.

REFERENCES

The most important issue is what geometrical shapes can be used to define foreground and background area.

With respect to 2D geometrical shapes in a chromatic plane, U.S. Pat. No. 4,533,937 discloses a conventional method of using rhombus but suggests a group of quadratic curves include a polar quadratic curve, ellipse, and hyperbola, parabola; and U.S. Pat. No. 5,812,214 uses a circle to define background color area, and uses a polygon to separate foreground and transition areas.

With respect to 3D geometrical volumes in a color space, U.S. Pat. No. 5,355,174 uses a smaller polyhedron to define background and a larger polyhedron wrapping the smaller one to separate foreground and transition areas; U.S. Pat. No. 5,774,191 equivalently uses box-shaped volume; U.S. Pat. No. 5,903,318 and No. 5,923,381 use a cone-shaped volume and conical frustum; U.S. Pat. No. 5,719,640 separates a color space into two sub-spaces with a boundary surface or a boundary curve (if the boundary surface or curve is linear, this method can be thought as a particular case of polyhedron method in United States Paten No. 5,355,174, except that the background polyhedron is shrunk to a point); and U.S. Pat. No. 6,445,816 equivalently uses an ellipsoid/spheroid.

A color space includes either chromaticity domain, such as color differences Cr-Cb and its variant U-V, or luminance-chrominance and three primary colors RGB. Most inventions in chroma key techniques started their ideas from one of color spaces and then extended the ideas into the other color spaces with or without proof. In the various geometrical shapes, the polyhedron method is most powerful provided that there is enough number of faces used. This is because the polyhedron has no regular shape and it can be easily reshaped to fit various boundaries of color distributions. The other regular solid geometric shapes hardly separate complicated real color distributions of a picture into background and foreground areas because of their regularity. However, the complexity of implementation of the polyhedron also poses a difficulty to those applications, and which requires high-speed calculation in real time. Even for those solid geometrical shapes, the computing cost is also high due to the requirement of calculation in a 3D space.

U.S. Pat. No. 4,630,101 discloses a chromakey signal producing apparatus.

U.S. Pat. No. 4,344,085 discloses a comprehensive electronic compositing system background video signal to be combined with a foreground video signal U.S. Pat. Nos. 5,032,901, 5,424,781, and 5,515,109 disclose backing color and luminance non-uniformity compensation for linear image compositing.

U.S. Pat. No. 5,343,255 discloses a Method and apparatus for compositing video image (Ultimatte)

U.S. Pat. No. 5,202,762 discloses a method and apparatus for applying correction to a signal used to modulate a chromakey method and apparatus disclosed in U.S. Pat. No. 5,249,039.

U.S. Pat. No. 5,249,039 discloses a chromakey method and apparatus.

U.S. Pat. No. 5,400,081 discloses a chroma keyer with correction for background defects.

U.S. Pat. No. 5,539,475 discloses a method of and apparatus for deriving a key signal from a digital video signal.

U.S. Pat. No. 5,708,479 discloses a method of inserting a background picture signal into parts of a foreground picture signal, and arrangement for performing the method.

U.S. Pat. No. 6,141,063 discloses a chromakey method and arrangement.

U.S. Pat. No. 5,500,684 discloses a chromakey live-video compositing circuit.

U.S. Pat. No. 5,838,310 discloses a chromakey signal generator.

U.S. Pat. No. 6,011,595 discloses a method for segmenting a digital image into a foreground region and a key color region.

U.S. Pat. Nos. 6,134,345, and 6,134,346 disclose a comprehensive method for removing from an image the background surrounding a selected subject.

U.S. Pat. No. 6,348,953 discloses a method for producing a composite image from a foreground image and a background image.

[1] A. R. Smith, "Blue Screen Matting", Computer Graphics: Proceedings of the ACS, pp. 259-268, 1996.

[2] A. R. Smith, "Image Compositing Fundamentals," Technical Memo 4, Microsoft Corporation, June 1995

[3] R. Smith, "Alpha and the History of Digital Compositing," Technical Memo 7, Microsoft Corporation, August 1995.

[4] T. Porter and T. Duff, "Compositing Digital Images," presented in Proceedings of SIGGRAPH 84 and published in Computer Graphics 18, 3, pp. 253-259, July 1984.

[5] J. F. Blinn, "Jim Blinn's Corner: Compositing Part 1: Theory," IEEE Computer Graphics & Applications, September 1994, pp. 83-87.

[6] J. F. Blinn, "Jim Blinn's Corner: Compositing Part 2: Practice," IEEE Computer Graphics & Applilcations, November 1994, pp. 78-82.

[7] F. Fechter, C. Ricken, "Signal Processing for a Digital HDTV Chromakey Mixer," Signal Processing, Image Communication 5 (1993), S. 417-423.

[8] M. A. Ruzon and Carlo Tomasi, "Alpha Estimation in Natural Images," IEEE Conference of Computer Vision and Pattern Recognition (CVPR'2000), pp. 18-25, June 2000.

[9] P. Hillman, J. Hannah, and D. Renshaw, "Alpha Channel Estimation in High Resolution Images and Image Sequences," IEEE Computer Society Conference on Computer Vision and Pattern Recognition (CVPR'2001), V1, pp. 1063-68, December 2001

[10] Y. Y. Chuang, B. Curless, D. H. Salesin, and R. Szeliski, "A Bayesian Approach to Digital Matting," IEEE Conference of Computer Vision and Pattern Recognition (CVPR 2001), Vol. 2, pp. 264-271, December 2001.

[11] Y. Y. Chuang, A. Agarwala, B. Curless, D. H. Salesin, and R. Szeliski, "Video Matting of Complex Scenes", appear as ACM Transactions on Graphics, Vol. 21, No 3, pp 243-248 (SIGGRAPH 2002, July 2002, San Antonio).

[12] Y. LIU, "Overview & Proposal—Advanced Chromakey Technology", Ross Video Technical Report, Sep. 20, 2002.

[13] "SMPTE Standard for Television—1920×1080 scanning and interface", SMPTE 274M-1995

[14] "SMPTE Recommended Practice—Derivation of Basic Television Color Equations", SMPTE RP177-1993

What is claimed is:

1. A method for generating a clean clipping signal $\alpha$ for a chromakey function or a video composition where still and moving subjects shot against a solid color background by a video camera are clipped out and overlaid on a new complex background, comprising the steps of:
 identifying background colors which are formed by the solid color background, shadows cast by the still and moving subjects, non-uniform reflection caused by spot lighting and non-flat backdrop or flaw wall, and translucent foreground objects, with a 3D volume in a 3D color space;
 automatically determining parameters which define the 3D volume by using a dirty alpha $\alpha$;
 generating a clean clipping signal $\alpha_{shd}$ for the background colors, which occurs to the colors identified as the shadow colors or confined by the 3D volume for the shadow colors, and a clean clipping signal $\alpha_{tsl}$ for the translucency colors, which occur to the colors identified as the translucent areas' colors;
 identifying foreground colors which are formed by the still and moving subjects with a 3D volume in a 3D color space;
 classifying into transition colors those which are not identified as either the background or the foreground; and
 generating an area map which labels each pixel as one of the areas such as background, shadow, translucent area, foreground and transition areas.

2. The method of claim 1, wherein identifying the background colors comprises identifying the background colors using a bounding box or a bounding rectangle which confines the 3D volume for the background colors to a box in a 3D color space.

3. The method of claim 1, wherein identifying the background colors comprises identifying a nominal backing color and a shadow axis of the 3D volume for the background colors in a 3D color space, the shadow axis being a semi line starting from the origin and passing through the nominal backing color, which confines the 3D volume for the shadow colors within a wedged box in a 3D color space.

4. The method of claim 1, wherein identifying the shadow colors comprises identifying the shadow colors using a two-semi-ellipse cylindrical segment which is confined by the wedged box in a 3D color space.

5. The method of claim 1, wherein the step of generating a clean clipping signal $\alpha_{shd}$ further includes the projection of a pixel color onto the shadow axis, which is represented by:

$$\alpha_{shd} = K_{shd}\frac{\vec{C}_{bg} \cdot \vec{C}_{key}}{\vec{C}_{key} \cdot \vec{C}_{key}} = K_{shd}\frac{y_{bg}y_{key} + u_{bg}u_{key} + v_{bg}v_{key}}{y_{key}y_{key} + u_{key}u_{key} + v_{key}v_{key}} \text{ or}$$

$$\alpha_{shd} = (k_{shd}y_{key})y_{bg} + (k_{shd}u_{key})u_{bg} + (k_{shd}v_{key})v_{bg}$$

where $k_{shd}$ is a factor to emphasize or de-emphasize shadow effects in composition.

6. The method of claim 5, wherein generating the clean clipping signal $\alpha_{shd}$ further comprises generating a square root $\sqrt{\alpha_{shd}}$ of $\alpha_{shd}$.

7. The method of claim 1, wherein identifying the background colors comprises identifying one or multiple translucency axis of the 3D volume for the background colors in a 3D color space, the translucency axis being a semi line starting from a lighting color reflected from translucent objects in foreground and passing through the nominal backing color, and the lighting color being a different color, including mostly a white color.

8. The method of claim 1, wherein the step of generating a clean clipping signal $\alpha_{tsl}$ further includes the projection of a pixel color onto a translucency axis, which is represented by:

$$\alpha_{tsl} = K_{tsl}\frac{(\vec{C}_{bg} - \vec{C}_{wht}) \cdot \vec{C}_{tsl}}{\vec{C}_{tsl} \cdot \vec{C}_{tsl}} =$$

$$K_{tsl}\frac{(y_{bg} - y_{wht})y_{tsl} + (u_{bg} - u_{wht})u_{tsl} + (v_{bg} - v_{wht})v_{tsl}}{y_{tsl}y_{tsl} + u_{tsl}u_{tsl} + v_{tsl}v_{tsl}} \text{ or}$$

$$\alpha_{tsl} = k_{tsl}y_{tsl}(y_{bg} - y_{wht}) + k_{tsl}u_{tsl}(u_{bg} - u_{wht}) + k_{tsl}v_{tsl}(v_{bg} - v_{wht})$$

where $k_{tsl}$ is a factor to emphasize or de-emphasize translucency effects in composition.

9. The method of claim 8, wherein generating the clean clipping signal $\alpha_{tsl}$ further comprises generating a square root $\sqrt{\alpha_{tsl}}$ of $\alpha_{tsl}$.

10. The method of claim 1, wherein identifying foreground colors comprises identifying foreground colors using, as the 3D volume for foreground colors, a 3D volume which may overlap the 3D volume for the background colors.

11. The method of claim 1, wherein the step of automatically determining parameters comprises the steps of:
   initializing the 3D volume for the background colors;
   generating a low-cost dirty clipping signal or the dirty alpha $\alpha$;
   using the dirty alp ha or a value derived from the dirty alpha to construct a part of a weight;
   generating a norm distance $\Delta$ or a modified norm distance $\delta$ from a pixel color of interest to the shadow axis or from a pixel color along the shadow axis to the nominal backing color;
   using the norm distance $\Delta$ or $\delta$ to construct another part of a weight;
   generating weighed color components by multiplying each color component with the weights;
   accumulating each weighed color component pixel by pixel and averaging the accumulated weighed color component;
   deriving parameters from the average of accumulated weighed color component and using them to determine the nominal backing color and a bounding box which defines two semi-ellipses;
   repeatedly implementing the initializing to accumulating steps N times (N≧3) to achieve the best results during initialization; and
   recursively implementing the initializing to accumulating steps every M (M≧1) frames to update the parameters on the fly.

12. The method of claim 11, wherein the step of initializing the 3D volume for the background colors comprises generating a chromatic plane divided into 6 equal sectors such that each sector center is exclusively passed through by one of 3 principal colors (red, green, blue) and 3 complementary colors (yellow, magenta, cyan), and the initial 3D volume for the background colors stands on one of the 6 sectors.

13. The method of claim 11, wherein the step of generating a dirty alpha comprises either using a standalone function or using intermediate results from a function which generates a clean alpha.

14. The method of claim 11, wherein the step of constructing a weight w comprises either directly multiplying a low-cost dirty alpha with a norm distance or generating an arithmetic combination of a low-cost dirty alpha and a norm distance, including a function $f$ in terms of $\Delta$ and $\alpha$ such that:

$$w=f(\alpha, \Delta).$$

15. The method of claim 11, wherein generating weighted color components comprises multiplying, with the weights, each color component in one of the following: luminance and color difference (L, Cr, Cb), luminance and modified color difference vector (L, U, V), (L, I, Q), (L, Pr, Pb), (L, H, S), luminance and a color difference derived from CIE XYZ color system, and principal color R, G, B.

16. The method of claim 11, wherein the step of accumulating each weighed color component comprises accumulating of an entire frame of a picture or an entire field of a picture or most parts of a picture.

17. The method of claim 11, wherein the step of deriving from the averages of accumulated weighed color components further comprises generating a series of functions which receive the averages of accumulated weighed color components as inputs and generate parameters as outputs for the wedged bounding box, the two semi-ellipse cylindrical segment, the nominal backing color.

18. The method of claim 1, wherein the step of automatically determining parameters includes using the dirty alpha from a low-cost clipping signal generator or intermediate results from a high-cost clipping signal generator to form a part of weight signals which weigh chrominance-luminance signals to determine the parameters.

19. The method of claim 1, wherein the step of generating an area map includes employing information from an identification or classification process in a chromatic plane or a color space and forming a map or display to show different areas, including at least one of a solid backing color area, a shadow area, translucent areas, and transition areas.

20. The method of claim 1, wherein the area map includes its application to a part of user interface in a chromakey-based composition systems.

21. A computer program product stored on a computer-readable medium for generating a clean clipping signal $\alpha$ for a chromakey function or a video composition, and including one or more computer-readable instructions configured to cause one or more computer processors to perform the steps recited in claim 1.

22. A computer system for generating a clean clipping signal α for a chromakey function or a video composition and configured to cause one or more computer processors to perform the steps recited in claim 1.

23. A device for generating a clean clipping signal α for a chromakey function or a video composition and configured to cause one or more computer processors to perform the steps recited in claim 1.

24. A device for generating a clean clipping signal α for a chromakey function or a video composition where still and moving subjects shot against a solid color background by a video camera are clipped out and overlaid on a new complex background, the device comprising:
   means for identifying background colors which are formed by the solid color background, shadows cast by the still and moving subjects, non-uniform reflection caused by spot lighting and non-flat backdrop or flaw wall, and translucent foreground objects, with a 3D volume in a 3D color space;
   means for automatically determining parameters which define the 3D volume by using a dirty alpha α;
   means for generating a clean clipping signal $\alpha_{shd}$ for the background colors, which occurs to the colors identified as the shadow colors or confined by the 3D volume for the shadow colors, and a clean clipping signal $\alpha_{tsl}$ for the translucency colors, which occur to the colors identified as the translucent areas' colors;
   means for identifying foreground colors which are formed by the still and moving subjects with a 3D volume in a 3D color space;
   means for classifying into transition colors those which are not identified as either the background or the foreground; and
   means for generating an area map which labels each pixel as one of the areas such as background, shadow, translucent area, foreground and transition areas.

25. The device of claim 24, wherein the 3D volume for identifying the background colors further comprises a bounding box or a bounding rectangle which confines the 3D volume for the background colors to a box in a 3D color space.

26. The device of claim 24, wherein the 3D volume for the background colors further comprises a nominal backing color and a shadow axis in a 3D color space, and the shadow axis is a semi line starting from the origin and passing through the nominal backing color, which confines the 3D volume for the shadow colors within a wedged box in a 3D color space.

27. The device of claim 24, wherein the 3D volume for identifying the shadow colors comprises a two-semi-ellipse cylindrical segment which is confined for shadow area's colors by the wedged box in a 3D color space.

28. The device of claim 24, wherein the means for generating a clean clipping signal $\alpha_{shd}$ further includes means for projecting a pixel color onto the shadow axis, which is represented by:

$$\alpha_{shd} = K_{shd} \frac{\vec{C}_{bg} \cdot \vec{C}_{key}}{\vec{C}_{key} \cdot \vec{C}_{key}} = K_{shd} \frac{y_{bg}y_{key} + u_{bg}u_{key} + v_{bg}v_{key}}{y_{key}y_{key} + u_{key}u_{key} + v_{key}v_{key}} \text{ or}$$

$$\alpha_{shd} = (k_{shd}y_{key})y_{bg} + (k_{shd}u_{key})u_{bg} + (k_{shd}v_{key})v_{bg}$$

where $k_{shd}$ is a factor to emphasize or de-emphasize shadow effects in composition.

29. The device of claim 28, wherein the clean clipping signal $\alpha_{shd}$ further comprises a square root $\sqrt{\alpha_{shd}}$ of $\alpha_{shd}$.

30. The device of claim 24, wherein the 3D volume for identifying the background colors further comprises one or multiple translucency axis in a 3D color space, the translucency axis is a semi line starting from a lighting color reflected from translucent objects in foreground and passing through the nominal backing color, and the lighting color is a different color, including mostly a white color.

31. The device of claim 24, wherein the means for generating a clean clipping signal $\alpha_{tsl}$ further includes means for projecting a pixel color onto a translucency axis, which is represented by:

$$\alpha_{tsl} = K_{tsl} \frac{(\vec{C}_{bg} - \vec{C}_{wht}) \cdot \vec{C}_{tsl}}{\vec{C}_{tsl} \cdot \vec{C}_{tsl}} =$$

$$K_{tsl} \frac{(y_{bg} - y_{wht})y_{tsl} + (u_{bg} - u_{wht})u_{tsl} + (v_{bg} - v_{wht})v_{tsl}}{y_{tsl}y_{tsl} + u_{tsl}u_{tsl} + v_{tsl}v_{tsl}} \text{ or}$$

$$\alpha_{tsl} = k_{tsl}y_{tsl}(y_{bg} - y_{wht}) + k_{tsl}u_{tsl}(u_{bg} - u_{wht}) + k_{tsl}v_{tsl}(v_{bg} - v_{wht})$$

where $k_{tsl}$ is a factor to emphasize or de-emphasize translucency effects in composition.

32. The device of claim 31, wherein the clean clipping signal $\alpha_{tsl}$ further comprises a square root $\sqrt{\alpha_{tsl}}$ of $\sqrt{\alpha_{tsl}}$.

33. The device of claim 24, wherein the 3D volume for identifying foreground colors further comprises a 3D volume which may overlap the 3D volume for the background colors.

34. The device of claim 24, wherein the means for automatically determining parameters comprises:
   means for initializing the 3D volume for the background colors;
   means for generating a low-cost dirty clipping signal or the dirty alpha α;
   means for using the dirty alpha or a value derived from the dirty alpha to construct a part of a weight;
   means for generating a norm distance Δ or a modified norm distance δ from a pixel color of interest to the shadow axis or from a pixel color along the shadow axis to the nominal backing color;
   means for using the norm distance Δ or δ to construct another part of a weight;
   means for generating weighed color components by multiplying each color component with the weights;
   means for accumulating each weighed color component pixel by pixel and averaging the accumulated weighed color component;
   means for deriving parameters from the average of accumulated weighed color component and using them to determine the nominal backing color and a bounding box which defines two semi-ellipses;
   means for repeatedly implementing the processing of the initializing to accumulating means N times (N≧3) to achieve the best results during initialization; and
   means for recursively implementing the processing of the initializing to accumulating means every M (M≧1) frames to update the parameters on the fly.

35. The device of claim 34, wherein the means for initializing the 3D volume for the background colors comprises means for generating a chromatic plane divided into 6 equal sectors such that each sector center is exclusively passed through by one of 3 principal colors (red, green, blue) and 3 complementary colors (yellow, magenta, cyan), and the initial 3D volume for the background colors stands on one of the 6 sectors.

36. The device of claim 34, wherein the means for generating a dirty alpha comprises either means for using a standalone function or means for using intermediate results from a function which generates a clean alpha.

37. The device of claim 34, wherein the means for constructing a weight w comprises either means for directly multiplying a low-cost dirty alpha with a norm distance or means for generating an arithmetic combination of a low-cost dirty alpha and a norm distance, including a function $f$ in terms of $\Delta$ and $\alpha$ such that:

$$w = f(\alpha, \Delta).$$

38. The device of claim 34, wherein the color component comprises a color component in one of the following: luminance and color difference (L, Cr, Cb), luminance and modified color difference vector (L, U, V), (L, I, Q), (L, Pr, Pb), (L, H, S), luminance and a color difference derived from CIE XYZ color system, and principal color R, G, B.

39. The device of claim 34, wherein the means for accumulating each weighed color component comprises means for accumulating of an entire frame of a picture or an entire field of a picture or most parts of a picture.

40. The device of claim 34, wherein the means for deriving from the averages of accumulated weighed color components further comprises means for generating a series of functions which receive the averages of accumulated weighed color components as inputs and generate parameters as outputs for the wedged bounding box, the two semi-ellipse cylindrical segment, the nominal backing color.

41. The device of claim 34, wherein the means for automatically determining parameters includes means for using the dirty alpha from a low-cost clipping signal generator or intermediate results from a high-cost clipping signal generator to form a part of weight signals which weigh chrominance-luminance signals to determine the parameters.

42. The device of claim 24, wherein the means for generating an area map includes means for employing information from an identification or classification process in a chromatic plane or a color space, and means for forming a map or display to show different areas, including at least one of a solid backing color area, a shadow area, translucent areas, and transition areas.

43. The device of claim 24, wherein the area map includes its application to a part of user interface in a chromakey-based composition system.

44. A system for generating a clean clipping signal $\alpha$ for a chromakey function or a video composition where still and moving subjects shot against a solid color background by a video camera are clipped out and overlaid on a new complex background, the system comprising:

means for identifying background colors which are formed by the solid color background, shadows cast by the still and moving subjects, non-uniform reflection caused by spot lighting and non-flat backdrop or flaw wall, and translucent foreground objects, with a 3D volume in a 3D color space;

means for automatically determining parameters which define the 3D volume by using a dirty alpha $\alpha$;

means for generating a clean clipping signal $\alpha_{shd}$ for the background colors, which occurs to the colors identified as the shadow colors or confined by the 3D volume for the shadow colors, and a clean clipping signal $\alpha_{tsl}$ for the translucency colors, which occur to the colors identified as the translucent areas' colors;

means for identifying foreground colors which are formed by the still and moving subjects with a 3D volume in a 3D color space;

means for classifying into transition colors those which are not identified as either the background or the foreground; and means for generating an area map which labels each pixel as one of the areas such as background, shadow, translucent area, foreground and transition areas.

45. The system of claim 44, wherein the 3D volume for identifying the background colors further comprises a bounding box or a bounding rectangle which confines the 3D volume for the background colors to a box in a 3D color space.

46. The system of claim 44, wherein the 3D volume for the background colors further comprises a nominal backing color and a shadow axis in a 3D color space, and the shadow axis is a semi line starting from the origin and passing through the nominal backing color, which confines the 3D volume for the shadow colors within a wedged box in a 3D color space.

47. The system of claim 44, wherein the 3D volume for identifying the shadow colors comprises a two-semi-ellipse cylindrical segment which is confined for shadow area's colors by the wedged box in a 3D color space.

48. The system of claim 44, wherein the means for generating a clean clipping signal $\alpha_{shd}$ further includes means for projecting a pixel color onto the shadow axis, which is represented by:

$$\alpha_{shd} = K_{shd} \frac{\vec{C}_{bg} \cdot \vec{C}_{key}}{\vec{C}_{key} \cdot \vec{C}_{key}} = K_{shd} \frac{y_{bg} y_{key} + u_{bg} u_{key} + v_{bg} v_{key}}{y_{key} y_{key} + u_{key} u_{key} + v_{key} v_{key}} \text{ or}$$

$$\alpha_{shd} = (k_{shd} y_{key}) y_{bg} + (k_{shd} u_{key}) u_{bg} + (k_{shd} v_{key}) v_{bg}$$

where $k_{shd}$ is a factor to emphasize or de-emphasize shadow effects in composition.

49. The system of claim 44, wherein the clean clipping signal $\alpha_{shd}$ further comprises a square root $\sqrt{\alpha_{shd}}$ of $\alpha_{shd}$.

50. The system of claim 44, wherein the 3D volume for identifying the background colors further comprises one or multiple translucency axis in a 3D color space, the translucency axis is a semi line starting from a lighting color reflected from translucent objects in foreground and passing through the nominal backing color, and the lighting color is mostly a white color but can be any different color.

51. The system of claim 44, wherein the means for generating a clean clipping signal $\alpha_{tsl}$ further includes means for projecting a pixel color onto a translucency axis, which is represented by:

$$\alpha_{tsl} = K_{tsl} \frac{(\vec{C}_{bg} - \vec{C}_{wht}) \cdot \vec{C}_{tsl}}{\vec{C}_{tsl} \cdot \vec{C}_{tsl}}$$

$$= K_{tsl} \frac{(y_{bg} - y_{wht}) y_{tsl} + (u_{bg} - u_{wht}) u_{tsl} + (v_{bg} - v_{wht}) v_{tsl}}{y_{tsl} y_{tsl} + u_{tsl} u_{tsl} + v_{tsl} v_{tsl}} \text{ or}$$

$$\alpha_{tsl} = k_{tsl} y_{tsl} (y_{bg} - y_{wht}) + k_{tsl} u_{tsl} (u_{bg} - u_{wht}) + k_{tsl} v_{tsl} (v_{bg} - v_{wht})$$

where $k_{tsl}$ is a factor to emphasize or de-emphasize translucency effects in composition.

52. The system of claim 51, wherein the clean clipping signal $\alpha_{tsl}$ further comprises a square root $\sqrt{\alpha_{tsl}}$ of $\alpha_{tsl}$.

53. The system of claim 44, wherein the 3D volume for identifying foreground colors further comprises a 3D volume which may overlap the 3D volume for the background colors.

54. The system of claim 44, wherein the means for automatically determining parameters comprises:
means for initializing the 3D volume for the background colors;
means for generating a low-cost dirty clipping signal or the dirty alpha α;
means for using the dirty alpha or a value derived from the dirty alpha to construct a part of a weight;
means for generating a norm distance Δ or a modified norm distance δ from a pixel color of interest to the shadow axis or from a pixel color along the shadow axis to the nominal backing color;
means for using the norm distance Δ or δ to construct another part of a weight;
means for generating weighed color components by multiplying each color component with the weights;
means for accumulating each weighed color component pixel by pixel and averaging the accumulated weighed color component;
means for deriving parameters from the average of accumulated weighed color component and using them to determine the nominal backing color and a bounding box which defines two semi-ellipses;
means for repeatedly implementing the processing of the initializing to accumulating means N times (N≧3) to achieve the best results during initialization; and
means for recursively implementing the processing of the initializing to accumulating means every M (M≧1) frames to update the parameters on the fly.

55. The system of claim 54, wherein the means for initializing the 3D volume for the background colors comprises means for generating a chromatic plane divided into 6 equal sectors such that each sector center is exclusively passed through by one of 3 principal colors (red, green, blue) and 3 complementary colors (yellow, magenta, cyan), and the initial 3D volume for the background colors stands on one of the 6 sectors.

56. The system of claim 54, wherein the means for generating a dirty alpha comprises either means for using a standalone function or means for using intermediate results from a function which generates a clean alpha.

57. The system of claim 54, wherein the means for constructing a weight w comprises either means for directly multiplying a low-cost dirty alpha with a norm distance or means for generating an arithmetic combination of a low-cost dirty alpha and a norm distance, including a function $f$ in terms of Δ and α such that:

$$w=f(\alpha, \Delta).$$

58. The system of claim 54, wherein the color component comprises a color component in one of the following: luminance; and color difference (L, Cr, Cb), luminance and modified color difference vector (L, U, V), (L, I, Q), (L, Pr, Pb), (L, H, S), luminance and a color difference derived from CIL XYZ color system, and principal color R, G, B.

59. The system of claim 54, wherein the means for accumulating each weighed color component comprises means for accumulating of an entire frame of a picture or an entire field of a picture or most parts of a picture.

60. The system of claim 54, wherein the means for deriving from the averages of accumulated weighed color components further comprises means for generating a series of functions which receive the averages of accumulated weighed color components as inputs and generate parameters as outputs for the wedged bounding box, the two semi-ellipse cylindrical segment, the nominal backing color.

61. The system of claim 44, wherein the means for automatically determining parameters includes means for using the dirty alpha from a low-cost clipping signal generator or intermediate results from a high-cost clipping signal generator to form a part of weight signals which weigh chrominance-luminance signals to determine the parameters.

62. The system of claim 44, wherein the means for generating an area map includes means for employing information from an identification or classification process in a chromatic plane or a color space, and means for forming a map or display to show different areas, including at least one of a solid backing color area, a shadow area, translucent areas, and transition areas.

63. The system of claim 44, wherein the area map includes its application to a part of user interface in a chromakey-based composition system.

* * * * *

UNITED STATES PATENT AND TRADEMARK OFFICE
CERTIFICATE OF CORRECTION

PATENT NO. : 7,508,455 B2
APPLICATION NO. : 11/072502
DATED : March 24, 2009
INVENTOR(S) : Yu Liu et al.

Page 1 of 1

It is certified that error appears in the above-identified patent and that said Letters Patent is hereby corrected as shown below:

Column 17, claim 11, line 58, "...alp ha..." should be replaced with --...alpha...--;

Column 18, claim 20, line 64, "...systems..." should be replaced with --...system...--; and Column 24, claim 58, line 13, "...CIL..." should be replaced with --...CIE...--.

Signed and Sealed this

Twenty-second Day of December, 2009

David J. Kappos
*Director of the United States Patent and Trademark Office*